(12) United States Patent
Inoue

(10) Patent No.: US 9,183,775 B2
(45) Date of Patent: Nov. 10, 2015

(54) DISPLAY DEVICE, VIDEO PROCESSING DEVICE AND VIDEO DISPLAY METHOD

(75) Inventor: Haruhisa Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 111 days.

(21) Appl. No.: 13/699,271

(22) PCT Filed: Aug. 3, 2011

(86) PCT No.: PCT/JP2011/067785
§ 371 (c)(1),
(2), (4) Date: Nov. 20, 2012

(87) PCT Pub. No.: WO2012/032887
PCT Pub. Date: Mar. 15, 2012

(65) Prior Publication Data
US 2013/0113845 A1    May 9, 2013

(30) Foreign Application Priority Data

Sep. 6, 2010    (JP) ................................ 2010-198810

(51) Int. Cl.
*G03B 21/28*    (2006.01)
*G09G 3/22*    (2006.01)
(Continued)

(52) U.S. Cl.
CPC .............. *G09G 3/22* (2013.01); *G03B 21/2033* (2013.01); *G03B 21/28* (2013.01); *G03B 33/06* (2013.01); *G09G 3/002* (2013.01); *G09G 3/3413* (2013.01); *H04N 9/3111* (2013.01); *H04N 9/3155* (2013.01); *H04N 9/3182* (2013.01); *G09G 3/346* (2013.01); *G09G 3/3611* (2013.01); *G09G 5/028* (2013.01); *G09G 2310/0235* (2013.01); *G09G 2320/0242* (2013.01); *G09G 2330/08* (2013.01); *G09G 2360/147* (2013.01)

(58) Field of Classification Search
CPC ............. G09G 5/00; H04N 5/64; H04N 9/12; H04N 7/08; H04N 7/12; H04N 7/52; G03B 21/28; G06T 9/40
USPC ......... 345/85, 204, 589, 690, 759; 348/423.1, 348/743, 789; 382/239
See application file for complete search history.

(56) References Cited

U.S. PATENT DOCUMENTS 6,359,662 B1    3/2002    Walker
6,674,489 B1 *   1/2004    Kagawa et al. ............... 348/743
(Continued)

FOREIGN PATENT DOCUMENTS

CN    1637463 A    7/2005
CN    1828700 A    9/2006
(Continued)

*Primary Examiner* — Nicholas Lee
*Assistant Examiner* — Abdul-Samad A Adediran
(74) *Attorney, Agent, or Firm* — Birch, Stewart, Kolasch & Birch, LLP

(57) ABSTRACT

A normal video data acquisition section acquires, as normal video data, a plurality of pieces of video data respectively assigned to a plurality of light sources in normal display from an input video signal A computing section performs a predetermined computation on the plurality of pieces of video data included in the normal video data to generate auxiliary video data used in place of the normal video data in auxiliary display. A selection section performs, in accordance with an instruction from a control section, a selection process for providing any one of the normal video data and the auxiliary video data to a modulation driving section.

7 Claims, 17 Drawing Sheets

(51) Int. Cl.
*G03B 21/20* (2006.01)
*G03B 33/06* (2006.01)
*H04N 9/31* (2006.01)
*G09G 3/00* (2006.01)
*G09G 3/34* (2006.01)
*G09G 3/36* (2006.01)
*G09G 5/02* (2006.01)

(56) References Cited

U.S. PATENT DOCUMENTS

| | | | | |
|---|---|---|---|---|
| 7,088,398 | B1* | 8/2006 | Wolf et al. | 348/423.1 |
| 2002/0090138 | A1* | 7/2002 | Hamanaka | 382/239 |
| 2004/0021651 | A1* | 2/2004 | Takeuchi | 345/204 |
| 2005/0174495 | A1 | 8/2005 | Itoh et al. | |
| 2006/0192792 | A1 | 8/2006 | Inazumi | |
| 2008/0084511 | A1* | 4/2008 | Moizio et al. | 348/789 |

FOREIGN PATENT DOCUMENTS

| | | |
|---|---|---|
| JP | 4-320295 A | 11/1992 |
| JP | 2001-188514 A | 7/2001 |
| JP | 2002-116750 A | 4/2002 |
| JP | 2004-317557 A | 11/2004 |
| JP | 2005-331705 A | 12/2005 |
| JP | 2007-164009 A | 6/2007 |

* cited by examiner

F I G . 1
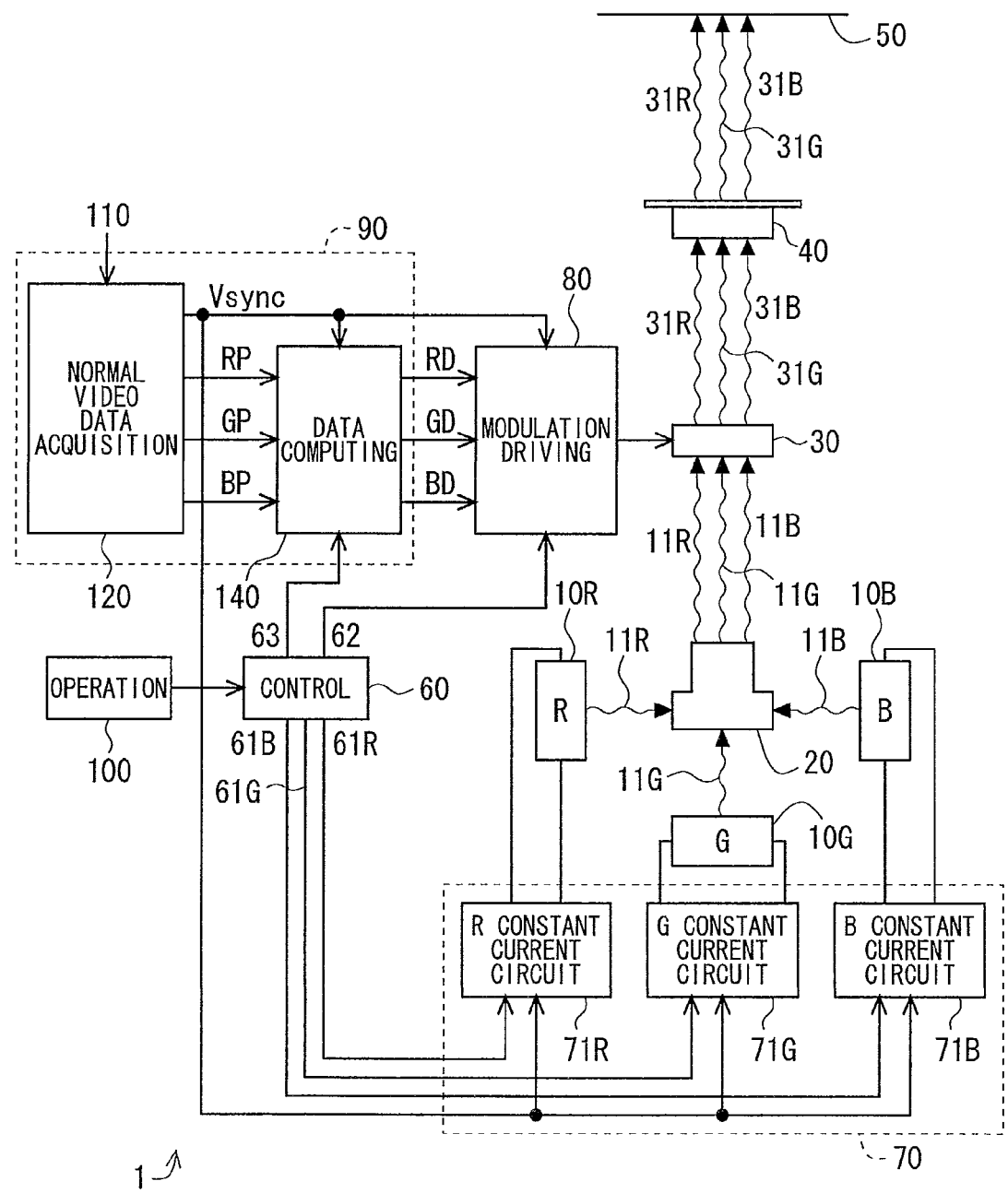

F I G . 7
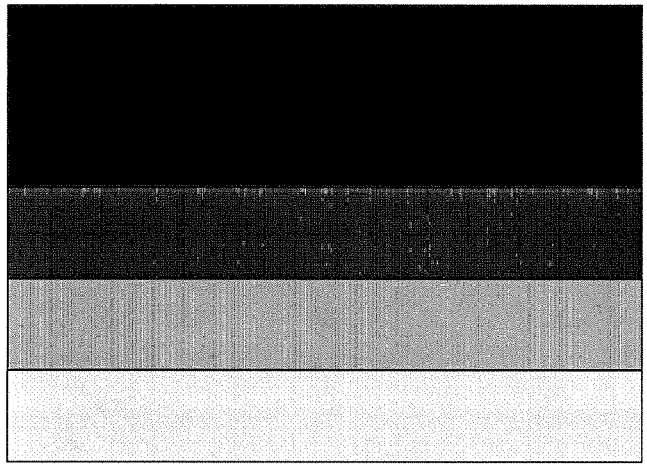
RD= 0, GD=0, BD=0 →
RD= 63, GD=0, BD=0 →
RD=127, GD=0, BD=0 →
RD=191, GD=0, BD=0 →
RD=255, GD=0, BD=0 →
F I G . 8
RD= 0, GD=0, BD=0 →
RD= 63, GD=0, BD=0 →
RD=127, GD=0, BD=0 →
RD=191, GD=0, BD=0 →
RD=255, GD=0, BD=0 →

F I G . 1 0
RD= 0, GD= 0, BD= 0 →
RD=19, GD=19, BD=19 →
RD=38, GD=38, BD=38 →
RD=57, GD=57, BD=57 →
RD=76, GD=76, BD=76 →

F I G. 1 2
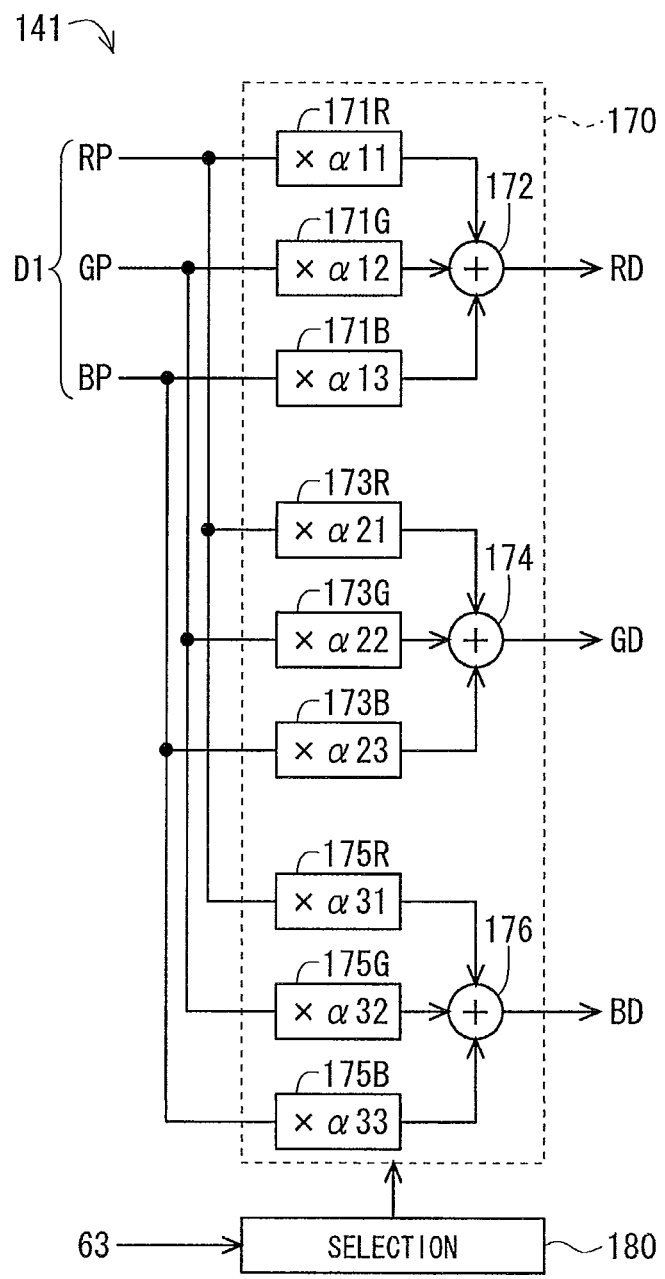

F I G. 1 6
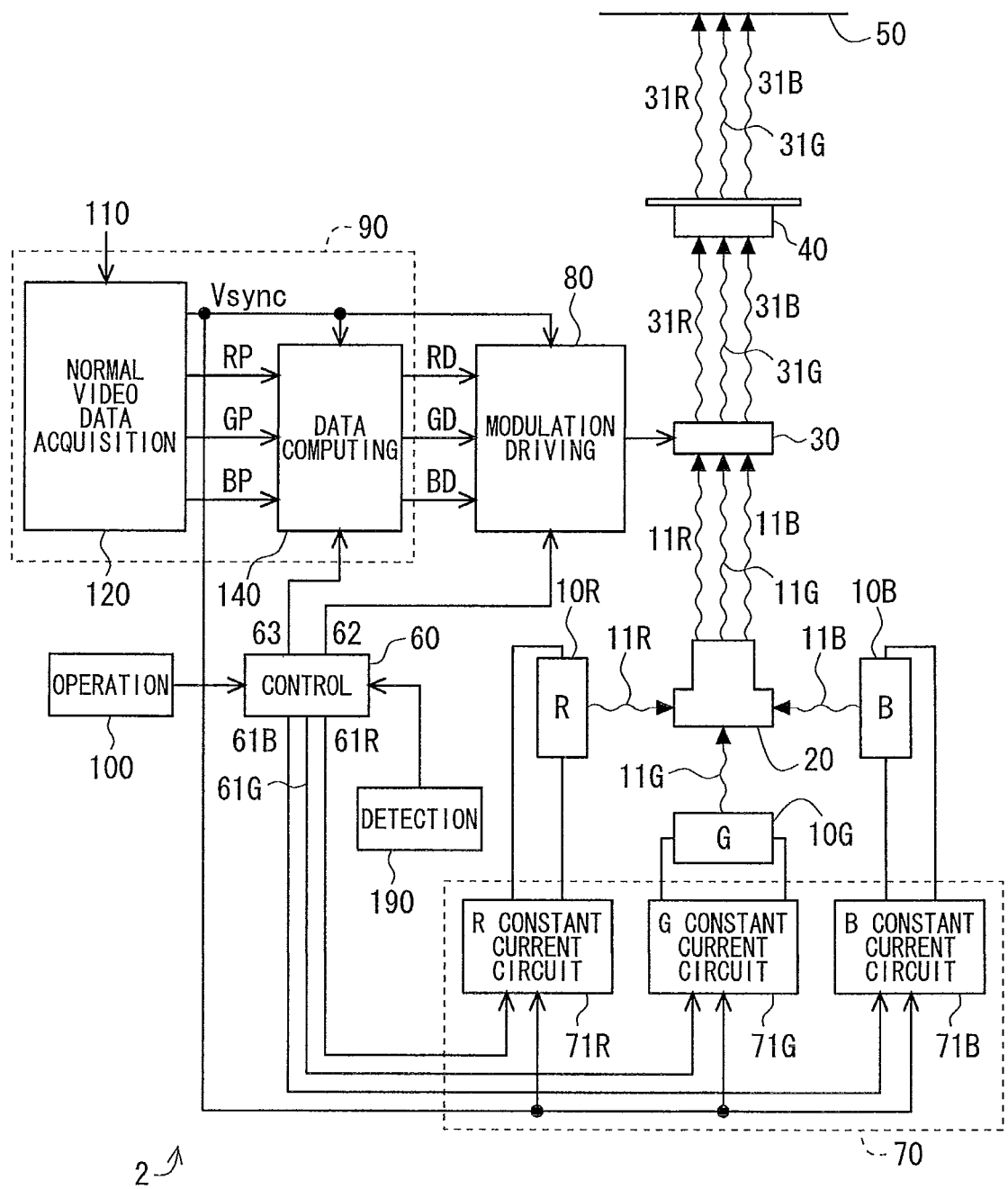

F I G . 1 8
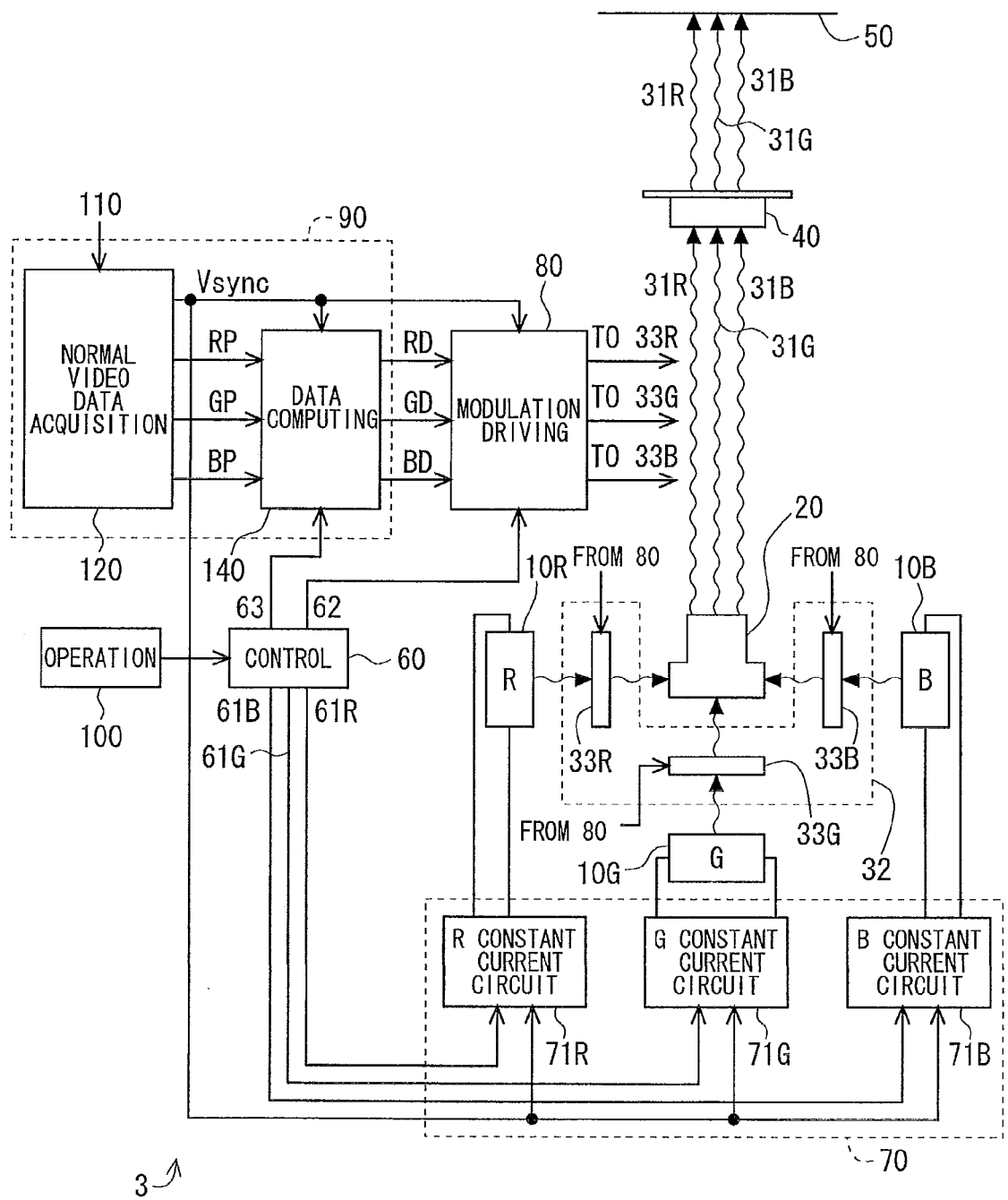

DISPLAY DEVICE, VIDEO PROCESSING DEVICE AND VIDEO DISPLAY METHOD

TECHNICAL FIELD

The present invention relates to a display device, a video processing device, and a video display method.

BACKGROUND ART

Recently, it has been proposed to use light emitting diodes (LEDs) as light sources in a projection-type display device. In particular, in a digital-light-processing (DLP; registered trademark)-type display device using a digital-micromirror-device, LEDs emitting a red light beam (hereinafter, also referred to as R-LEDs), LEDs emitting a green light beam (hereinafter, also referred to as G-LEDs), and LEDs emitting a blue light beam (hereinafter, also referred to as B-LEDs) are used, and the LEDs of three colors are turned on sequentially (see Patent Document 1). In such a projection-type display device, a driving circuit for a light source is provided for each emission color of the light source. More specifically, three constant current circuits consisting of a constant current circuit for R-LEDs, a constant current circuit for G-LEDs, and a constant current circuit for B-LEDs are provided correspondingly to emission colors of LEDs.

In the above-mentioned display device, input video signals are converted into pieces of digital data of respective colors, that is, red data (hereinafter, also referred to as R data), green data (hereinafter, also referred to as G data), and blue data (hereinafter, also referred to as B data), and the DMD is driven in accordance with the pieces of data of the respective colors, to thereby perform intensity modulation on the light beams of three colors. That is, a red light beam is subjected to intensity modulation in accordance with the R data, a green light beam is subjected to intensity modulation in accordance with the G data, and a blue light beam is subjected to intensity modulation in accordance with the B data. The light beams of three colors subjected to intensity modulation are projected onto a screen or the like through a projection lens, so that video images are displayed.

PRIOR ART DOCUMENTS

Patent Documents

Patent Document 1: Japanese Patent Application Laid-Open No. 2005-331705
Patent Document 2: Japanese Patent Application Laid-Open No. 2007-164099

SUMMARY OF INVENTION

Problems to be Solved by the Invention

In the above-mentioned display device, in a case where, for example, the R-LEDs cannot be turned on due to a failure of a constant current circuit or the like, the information to be represented by the R data is completely lost on a display. This may cause a problem that important information cannot be displayed.

For example, a situation in which another color cannot be turned on or a situation in which two colors cannot be turned on is also conceivable. Note that the emission colors of light sources and the number of emission colors are not limited to the three colors in the example above. A similar problem may also occur in a display device in which a light source other than LEDs is used and a display device in which light modulation means (for example, liquid crystal panel) other than the DMD is used.

The present invention has an object to provide a display device, a video processing device, and a video display method capable of avoiding a situation that the information assigned to a light source which cannot be turned on is not displayed at all even under a circumstance where a part of a plurality of light sources cannot be turned on.

Means to Solve the Problem

A display device according to an aspect of the present invention includes a plurality of light sources, modulation section performing optical intensity modulation on emitted light beams from the plurality of light sources, a modulation driving section driving the modulation section based on pieces of video data, a data providing section providing the pieces of video data to the modulation driving section, and a control section controlling the data providing section, wherein the data providing section includes: a normal video data acquisition section acquiring, as normal video data, a plurality of pieces of video data respectively assigned to the plurality of light sources in normal display from an input video signal; a computing section performing a predetermined computation on the plurality of pieces of video data included in the normal video data to generate auxiliary video data used in place of the normal video data in auxiliary display; and a selection section performing, in accordance with an instruction from the control section, a selection process for providing any one of the normal video data and the auxiliary video data to the modulation driving section.

Effects of the Invention

According to the aspect, switching can be made between normal video data and auxiliary video data. Therefore, in a case where, for example, a part of the light sources cannot be turned on, it is possible to avoid, with the use of the auxiliary video data, a situation that the information assigned to the light source that cannot be turned on in normal video data is not displayed at all.

Further, the conversion from the normal video data into the auxiliary video data is performed by a computation, whereby it is possible to, for example, make a conversion control flow simpler, reduce a size of a device configuration, and change the computation contents more easily compared with the conversion using a so-called look-up table (LUT).

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating a display device according to a first embodiment.

FIG. 7 is a diagram illustrating a displayed video image by the display device according to the first embodiment (normal display; all light sources can be turned on).

FIG. 8 is a diagram illustrating a displayed video image by the display device according to the first embodiment (normal display; the red light source cannot be turned on).

FIG. 10 is a diagram illustrating a displayed video image by the display device according to the first embodiment (auxiliary display; the red light source cannot be turned on).

FIG. 12 is a block diagram illustrating data computing means according to a second embodiment.

FIG. 16 is a block diagram illustrating a display device according to a fourth embodiment.

FIG. 18 is a block diagram illustrating a display device according to a fifth embodiment.

EMBODIMENTS FOR CARRYING OUT THE INVENTION

Figure 2:
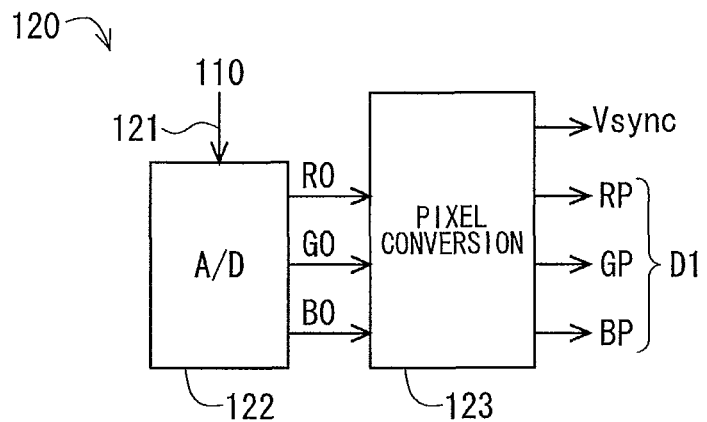
FIG. 2 is a block diagram illustrating normal video data acquisition means according to the first embodiment.

<First Embodiment>
<Overall Configuration of Display Device 1>

FIG. 1 illustrates a block diagram of a display device 1 according to a first embodiment. The display device 1 is a so-called projection-type display device, and a user views a video image projected onto a screen 50.

Typically, projection-type display devices are roughly classified into front-type ones and rear-type ones. In the front-type one, a user views a projected video image from the projection surface side of the screen 50. The front-type one is also referred to as direct-view-type one. Meanwhile, in the rear-type one, a user views a projected video image from the side opposite to the projection surface of the screen 50, that is, views a projected video image through the screen 50. The screen 50 can be implemented as, for example, an interior/exterior wall surface of a room and a glass surface, in addition to a dedicated member.

Illustrated here is a case in which the display device 1 is the front-type one, and the screen 50 is prepared as a member provided separately from the display device 1, which is not limited thereto. That is, the configuration of the display device 1 is also applicable to the rear-type one. Alternatively, the screen 50 constitutes one element of the display device 1 in some cases.

In the example of FIG. 1, the display device 1 includes three light sources 10R, 10G, and 10B, optical path combining means 20, modulation means 30, projection means 40, control means 60, light source driving means 70, modulation driving means 80, data providing means 90, and operation means 100. Note that, for example, "control means" is abbreviated as "control" in the diagram.

The light sources 10R, 10G, and 10B each emit a light beam of a predetermined color. While illustrated here is a case in which emission colors of the light sources 10R, 10G, and 10B are different from each other, the description below also holds true for a case in which the emission colors of the light sources 10R, 10G, and 10B are identical to each other.

Here, a case in which the light sources 10R, 10G, and 10B are LEDs is illustrated. More specifically, the case in which the light source 10R includes LEDs emitting a red light beam (hereinafter, also referred to as R-LEDs), the light source 10G includes LEDs emitting a green light beam (hereinafter, also referred to as G-LEDs), and the light source 10B includes LEDs emitting a blue light beam (hereinafter, also referred to as B-LEDs) is illustrated. In the following description, the light source 10R is also referred to as LED 10R or R-LED 10R at times, which holds true for the light sources 10G and 10B as well. The light sources 10R, 10G, and 10B can be configured as light sources other than LEDs, for example, a laser.

Light beams 11R, 11G, and 11B emitted from the LEDs 10R, 10G, and 10B sequentially pass through the optical path combining means 20, the modulation means 30, and the projection means 40 to be guided onto the same area of the screen 50. In other words, the LEDs 10R, 10G, and 10B, the optical path combining means 20, the modulation means 30, and the projection means 40 are disposed so as to follow such an optical path. Note that the optical path may be configured to include an element that is not illustrated here.

The optical path combining means 20 guides the emitted light beams 11R, 11G, and 11B from the LEDs 10R, 10G, and 10B toward the same direction, that is, along the same optical path. Illustrated here as the optical path combining means 20 is a dichroic mirror, and the optical path combining means 20 is also referred to as the dichroic mirror 20. The optical path combining means 20 is not limited to a dichroic mirror. Alternatively, the optical path combining means 20 may be composed of a plurality of optical components.

The modulation means 30 performs optical intensity modulation (hereinafter, also referred to as modulation) on the emitted light beams 11R, 11G, and 11B (in this case, the light beams 11R, 11G, and 11B after the adjustment of the optical path by the dichroic mirror 20) of the LEDs 10R, 10G, and 10B. The optical intensity modulation is performed on a pixel-by-pixel basis of the modulation means 30.

The modulation means 30 is formed of a single modulation element. In view of the above, the modulation means 30 is also referred to as the modulation element 30. The single modulation element 30 is shared among the LEDs 10R, 10G, and 10B, and processes the emitted light beams 11R, 11G, and 11B from the LEDs 10R, 10G, and 10B in a time division manner (in other words, in a time sequence manner).

The modulation element 30 can be implemented as, for example, a liquid crystal panel, a digital-micromirror-device (DMD), or the like. The optical intensity modulation by the modulation elements described above is performed using various well-known techniques, and detailed description thereof is not given here. Typically, the modulation elements are roughly classified into transmission-type ones and reflection-type ones, where a liquid crystal panel is an example of the transmission-type ones and the DMD is an example of the reflection-type ones. FIG. 1 illustrates the transmission-type modulation element 30.

The projection means 40 typically magnifies and projects light beams 31R, 31G, and 31B after modulation that are output from the modulation means 30. Here, the projection means 40 is formed of a single projection element (such as a projection lens). In view of the above, the projection means 40 is also referred to as the projection lens 40. A video image is projected onto the screen 50 located on the optical path by the modulated light beams 31R, 31G, and 31B projected from the projection lens 40. Note that the projection element may be a lens unit obtained by assembling a plurality of lenses or the like.

The control means 60 performs various processes described below (such as a control process and a user input acquisition process). The control means 60 can be configured to include, for example, a microprocessor (also referred to as MPU, CPU, or microcomputer) and a memory provided to be accessible to the microprocessor. In the case of this example, the microprocessor executes the processing steps (in other words, processing procedures) described in the program pre-stored in the memory, whereby the various processes are performed.

According to the above-mentioned configuration example, the microprocessor implements various functions corresponding to one or a plurality of processing steps. Alternatively, the microprocessor functions as various means corresponding to one or a plurality of processing steps.

The microprocessor can employ the configuration of, for example, a multiprocessor or a multi-core. The memory can be configured to include one or a plurality of, for example, a read only memory (ROM), a random access memory (RAM), and a rewritable non-volatile memory (such as an erasable programmable ROM (EPROM)). The memory stores a program as described above, and besides, stores various types of data and provides a work area for executing the program.

According to this configuration example, the various processes by the control means 60 are implemented as software, and a part or the whole of the various processes can be implemented as hardware.

The light source driving means 70 supplies driving power to the light sources 10R, 10G, and 10B, thereby driving the light sources 10R, 10G, and 10B. In the example in which the light sources 10R, 10G, and 10B are formed of LEDs, a constant current source is illustrated as an example of the light source driving means 70. Also illustrated here is the configuration in which a constant current circuit is provided for each of the LEDs 10R, 10G, and 10B. That is, the following are provided; an R constant current circuit 71R that supplies a driving current to the R-LED 10R, a G constant current circuit 71G that supplies a driving current to the G-LED 10G, and a B constant current circuit 71B that supplies a driving current to the B-LED 10B.

The R constant current circuit 71R obtains a vertical synchronizing signal Vsync from the data providing means 90 and obtains a control signal 61R from the control means 60, to thereby drive the R-LED 10R at a predetermined timing based on those signals Vsync and 61R. Similarly, the constant current circuits 71G and 71B obtain the vertical synchronizing signal Vsync from the data providing means 90 and obtain control signals 61G and 61B from the control means 60, respectively. Then, the G constant current circuit 71G drives the G-LED 10G at a predetermined timing based on the obtained signals Vsync and 61G at, and the B constant current circuit 71B drives the B-LED 10B at a predetermined timing based on the obtained signals Vsync and 61B. The drive timings of the LEDs 10R, 10G and 10B are described below.

The modulation driving means 80 obtains pieces of video data RD, GD, and BD assigned to the R-LED 10R, G-LED 10G, and B-LED 10B from the data providing means 90, respectively, to thereby drive the modulation element 30 based on the pieces of video data RD, GD, and BD. More specifically, the modulation driving means 80 controls supply of driving power to each pixel of the modulation element 30 in accordance with the pieces of video data RD, GD, and BD and the modulation technique employed by the modulation element 30. Accordingly, each pixel enters a predetermined state according to the employed modulation technique.

Also, the modulation driving means 80 obtains the vertical synchronizing signal Vsync from the data providing means 90 and obtains a control signal 62 from the control means 60, to thereby control the drive timing of the modulation element 30 based on those signals Vsync and 62. The above-mentioned drive timing is described below.

That is, the modulation driving means 80 drives each pixel of the modulation element 30 into a predetermined state at a predetermined timing.

The modulation driving means 80 can be implemented mainly by hardware as a so-called driving power supply and control circuit.

The data providing means 90 provides the pieces of video data RD, GD, and BD and the vertical synchronizing signal Vsync to the modulation driving means 80. In the example of FIG. 1, the data providing means 90 includes normal video data acquisition means 120 and data computing means 140. The data providing means 90 is described below.

The operation means 100 is a man-machine interface that connects a user and the display device 1, and here, is provided so as to communicate with the control means 60. Accordingly, the user can input various types of instructions and data to the control means 60 via the operation means 100. The operation means 100 can be implemented as, for example, an operation panel provided in the display device 1. Alternatively, the operation means 100 may be implemented as, for example, a remote control system.

Here, while the operation means 100 is illustrated as one element of the display device 1, it is also possible to use a device or the like provided separately from the display device 1 as the operation means 100. For example, the configuration may also be made such that the display device 1 is operated by operation means of a device (for example, personal computer) that is connected to the display device 1 and provides a video image to be displayed.

<Configuration of Data Providing Means 90>

Figure 3:
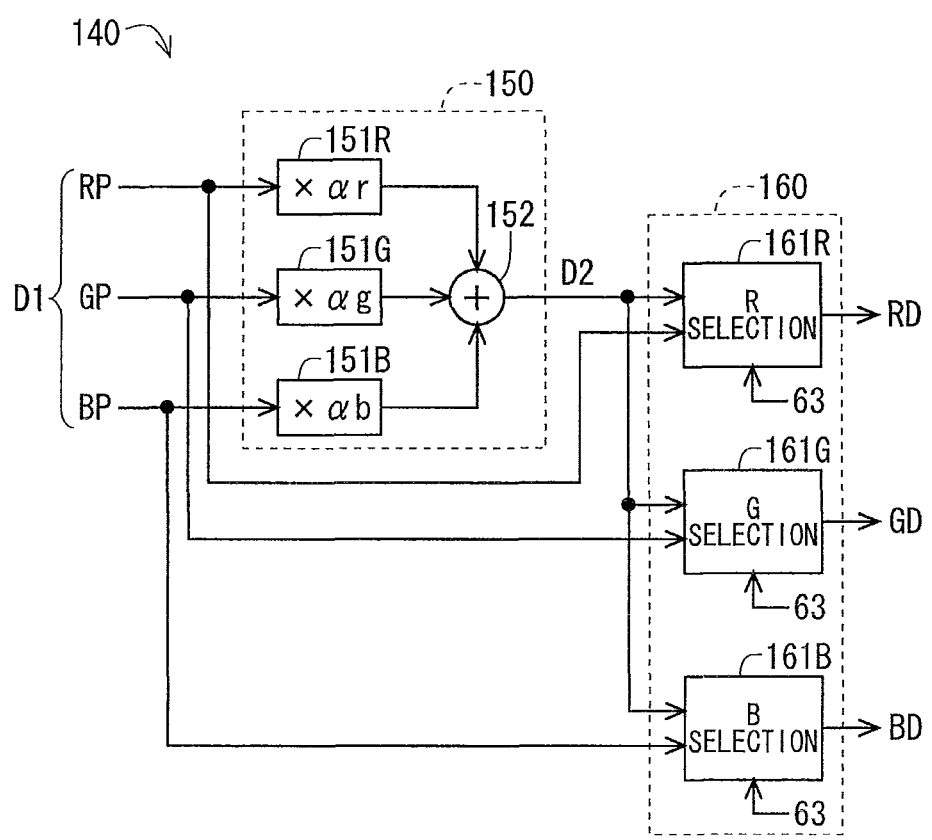
FIG. 3 is a block diagram illustrating data computing means according to the first embodiment.

In relation to the data providing means 90 (see FIG. 1), FIG. 2 illustrates a block diagram of the normal video data acquisition means 120, and FIG. 3 illustrates a block diagram of the data computing means 140.

<Configuration of Normal Video Data Acquisition Means 120>

The normal video data acquisition means 120 acquires pieces of video data RP, GP, and BP assigned to the LEDs 10R, 10G, and 10B in normal display, respectively, from an input video signal 110. Hereinafter, the pieces of video data RP, GP, and BP that are used in a normal case are collectively referred to as normal video data D1 in some cases.

In the example of FIG. 2, the normal video data acquisition means 120 includes an interconnect 121, an analog/digital converter (hereinafter, also refereed to as A/D) 122, and pixel conversion means 123.

The interconnect 121 transfers the input video signal 110 from a video supply source inside or outside of the display device 1 to the A/D 122. Illustrated here as the input video signal 110 is an analog RGB video signal output from a video card or the like of a personal computer.

The A/D 122 converts the input video signal 110 that has been input into pieces of digital data R0, G0, and B0. That is, the analog RGB video signal 110 is converted into the pieces of digital data R0, G0, and B0 regarding red, green, and blue components of a video image provided by the signal 110. Each of the pieces of digital data R0, G0, and B0 is, for example, 8 bits of data, in other words, 8 bits (256 levels) of gradation data.

The pixel conversion means 123 obtains the pieces of digital data R0, G0, and B0 from the A/D 122, and generates pieces of digital data RP, GP, and BP and the vertical synchronizing signal Vsync that match the output resolution and output timing of the display device 1, based on the pieces of data R0, G0, and B0. The vertical synchronizing signal Vsync is a signal serving as a reference when a video image of one frame is displayed, and has a frequency of, for example, 60 Hz.

For example, in a case where the input video signal 110 has the number of pixels of 1,024×768 and a vertical frequency of 80 Hz and specifications of the display device 1 are such that the number of pixels is 1,400×1,050 and the vertical frequency is 60 Hz, the pixel conversion means 123 magnifies and converts a video image having a resolution of 1,024×768 into one having a resolution of 1,400×1,050, and performs frame rate conversion such that an output frequency becomes equal to 60 Hz.

As a result of the above-mentioned conversion process, the pieces of digital data RP, GP, and BP are obtained. The pieces of digital data RP, GP, and BP after the conversion process are pieces of digital data regarding red, green, and blue components similarly to the pieces of digital data R0, G0, and B0 before the conversion process, each of which is, for example, 8 bits of data.

The pixel conversion means 123 can be implemented as hardware, software, or combination thereof.

The pieces of video data RP, GP, and BP (that is, normal video data D1) are provided to the data computing means 140 (see FIGS. 1 and 3). The vertical synchronizing signal Vsync is provided to the data computing means 140, the modulation driving means 80, and the constant current circuits 71R, 71G, and 71B (see FIG. 1), and is used as, for example, a reference signal of the operation timing.

The normal video data acquisition means 120 may be configured to output other data and signal, for example, a horizontal synchronizing signal provided to the data computing means 140 and the modulation driving means 80.

The input video signal 110 also may be, for example, a digital RGB video signal. Alternatively, the input video signal 110 is not only an RGB video signal but also may be a video signal in other format such as a video composite signal, a YCbCr signal, and an SDI signal. The configuration of the normal video data acquisition means 120 is appropriately changed in accordance with the type of the input video signal 110.

For example, in a case where the input video signal 110 includes the pieces of video data RP, GP, and BP and the vertical synchronizing signal Vsync, the normal video data acquisition means 120 is configured only of the interconnect 121 according to the example of FIG. 2, and the pieces of video data RP, GP, and BP and the vertical synchronizing signal Vsync are obtained by the interconnect 121.

<Configuration of Data Computing Means 140>

In the example of FIG. 3, the data computing means 140 includes computing means 150 and selection means 160.

The computing means 150 obtains the normal video data D1, that is, the pieces of video data RP, GP, and BP, and performs a predetermined computation on the pieces of data RP, GP, and BP, to thereby generate auxiliary video data D2. In other words, the computing means 150 converts the normal video data 124 into the auxiliary video data D2 in accordance with a predetermined computation. The auxiliary video data D2 is the video data used in place of the normal video data 124 in auxiliary display. The auxiliary display becomes apparent from the description below.

The computing means 150 illustrated in FIG. 3 includes multipliers 151R, 151G, and 151B and an adder 152. The multiplier 151R obtains video data RP regarding a red component included in the normal video data D1, multiplies the data RP by a predetermined coefficient αr (≠0), and outputs the multiplication result thereof. Similarly, the multipliers 151G and 151B obtain the pieces of video data GP and BP, multiply the pieces of data GP and BP by predetermined coefficients αg and αb (≠0), and output the multiplication results thereof. The adder 152 adds the multiplication results output from the multipliers 151R, 151G, and 151B together, and outputs the addition result as the auxiliary video data D2. The computation contents thereof are represented by Equation (1) below.

[Math 1]

$$D2 = \alpha r \times RP + \alpha g \times GP + \alpha b \times BP \tag{1}$$

That is, the computing means 150 executes the linear combination operation on the pieces of video data RP, GP, and BP. The coefficients αr, αg, and αb can be set to appropriate values (≠0).

For example, ITU-R BT. 601 established by the International Telecommunication Union (ITU) can be referred to. That is, ITU-R BT. 601 defines the equations regarding the conversion from RGB data into YCbCr data (hereinafter, represented as, for example, RGB→YCbCr), and of those, the equation for calculating luminance data Y from the RGB data is given by Equation (2) below.

[Math 2]

$$Y = 0.29891 \times R + 0.58661 \times G + 0.11448 \times B \tag{2}$$

In this case, the computing means 150 performs RGB→Y conversion compliant with ITU-R BT. 601 by employing the setting that αr=0.29891, αg=0.58661, and αb=0.11448.

For example, ITU-R BT. 709 defines the conversion equations regarding the RGB→YPbPr, and of those, the RGB→Y conversion equation is given by Equation (3) below.

[Math 3]

$$Y = 0.2126 \times R + 0.7152 \times G + 0.0722 \times B \tag{3}$$

In this case, the computing means 150 performs RGB→Y conversion compliant with ITU-R BT. 709 by employing the setting that αr=0.2126, αg=0.7152, and αb=0.0722.

Although the computation by the computing means 150 is not limited to the RGB→Y conversion, the case in which the computing means 150 performs the RGB→Y conversion is illustrated here. Therefore, the auxiliary video data D2 is also referred to as auxiliary video data Y hereinafter in some cases.

The selection means 160 performs the selection process for providing any one of the normal video data D1 and the auxiliary video data D2 to the modulation driving means 80 (see FIG. 1). This selection is performed in accordance with the instruction by the control means 60 (see FIG. 1).

Illustrated here is a configuration in which the selection means 160 obtains the normal video data D1 and the auxiliary video data D2, and outputs any one of the pieces of data D1 and D2 in accordance with the selection instruction by the control means 60.

That is, the selection means 160 illustrated in FIG. 3 includes R selection means 161R, G selection means 161G, and B selection means 161B. The R selection means 161R obtains the video data RP included in the normal video data D1 and the auxiliary video data D2, and outputs any one of the pieces of data RP and D2 as output data RD. Similarly, the G selection means 161G outputs the video data GP or auxiliary video data D2 as output data GD, and the B selection means 161B outputs the video data BP or auxiliary video data D2 as output data BD.

Here, the selection means 161R, 161G, and 161B obtain a control signal 63 from the control means 60 (see FIG. 1). The control signal 63 is a signal for transferring the instruction contents of data selection, and is set to any one of the instruction (for example, associated with an L level of the control signal 63) for selection of the normal video data D1, that is, pieces of video data RP, GP, and BP and the instruction (for example, associated with an H level of the control signal 63) for selection of the auxiliary video data D2.

The selection instructing signal 63 containing the same contents is provided to each of the selection means 161R, 161G, and 161B, whereby the selections of the selection means 161R, 161G, and 161B are performed in synchronization with each other. Therefore, the operation of outputting the pieces of video data RP, GP, and BP by the selection means 161R, 161G, and 161B, respectively (in other words, the operation of collectively outputting the normal video data D1 by the selection means 161R, 161G, and 161B) or the operation of outputting the auxiliary video data D2 by all of the selection means 161R, 161G, and 161B is performed alternatively.

In the example of FIG. 1, the pieces of data RD, GD, and BD selected and output by the selection means 161R, 161G, and 161B are provided to the modulation driving means 80. Here, the pieces of output data RD, GD, and BD may be provided to the modulation driving means 80 after being subjected to various predetermined processes. In view of those examples, the pieces of output data RD, GD, and BD from the selection means 161R, 161G, and 161B are provided to the modulation driving means 80 directly or indirectly. In other words, the data selection process by the selection means 160 is equivalent to the process of selecting a candidate of the video data to be provided to the modulation driving means 80.

The various processes by the computing means 150 and the selection means 160 can be implemented as hardware, software, or combination thereof.

Figure 4:
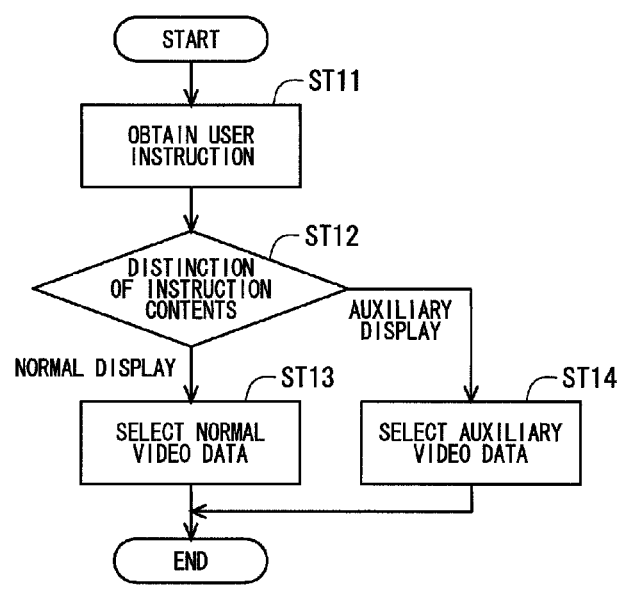
FIG. 4 is a flowchart illustrating video data selection according to the first embodiment.

Here, in the display device 1, the contents of the selection instructing signal 63 are set in accordance with the instruction by a user via the operation means 100. More specifically, as illustrated in the flowchart of FIG. 4, the control means 60 obtains the instruction from the user (Step ST11), and outputs the selection instructing signal 63 containing the contents according to the distinction result of the user instruction (Step ST12). Then, the selection means 160 selectively outputs the normal video data D1 or the auxiliary video data D2 in accordance with the contents of the selection instructing signal 63 (Steps ST13 and ST14).

<Operation of Display Device 1>

The operation of the display device 1 is illustrated with reference to FIGS. 5 to 11 in addition to FIGS. 1 to 4. FIGS. 5, 6, 9, and 11 illustrate the contents of the operation of the display device 1, and FIGS. 7, 8, and 10 illustrate displayed video images by the display device 1.

First, the operation of the display device 1 in normal display is described. The normal display is executed when a user requests a normal display via the operation means 100. The above-mentioned user instruction is input to the control means 60, and the control means 60 performs the next control process.

The control means 60 receives the instruction for normal display, and then transmits the instruction signal 63 for causing the selection means 160 of the data providing means 90 to select the normal video data D1, that is, the pieces of video data RP, GP and BP thereto (see FIG. 3). Accordingly, the pieces of normal video data RP, GP, and BP are provided to the modulation driving means 80 as the pieces of video data RD, GD, and BD. The normal video data D1 is provided in synchronization with the vertical synchronizing signal Vsync on a frame-by-frame basis (see FIG. 5).

In the case of differentiating frames, the pieces of video data RP, GP, and BP of the n-th frame are represented as RP(n), GP(n), and BP(n), where n is a natural number.

The control means 60 transmits the control signals 61R, 61G, 61B, and 62 regarding the setting of drive timing to the constant current circuits 71R, 71G, and 71B and the modulation driving means 80. The control signals 61R, 61G, 61B, and 62 herein contain the contents indicating that the operation is performed at timings obtained by dividing one frame period into three.

Figure 5:
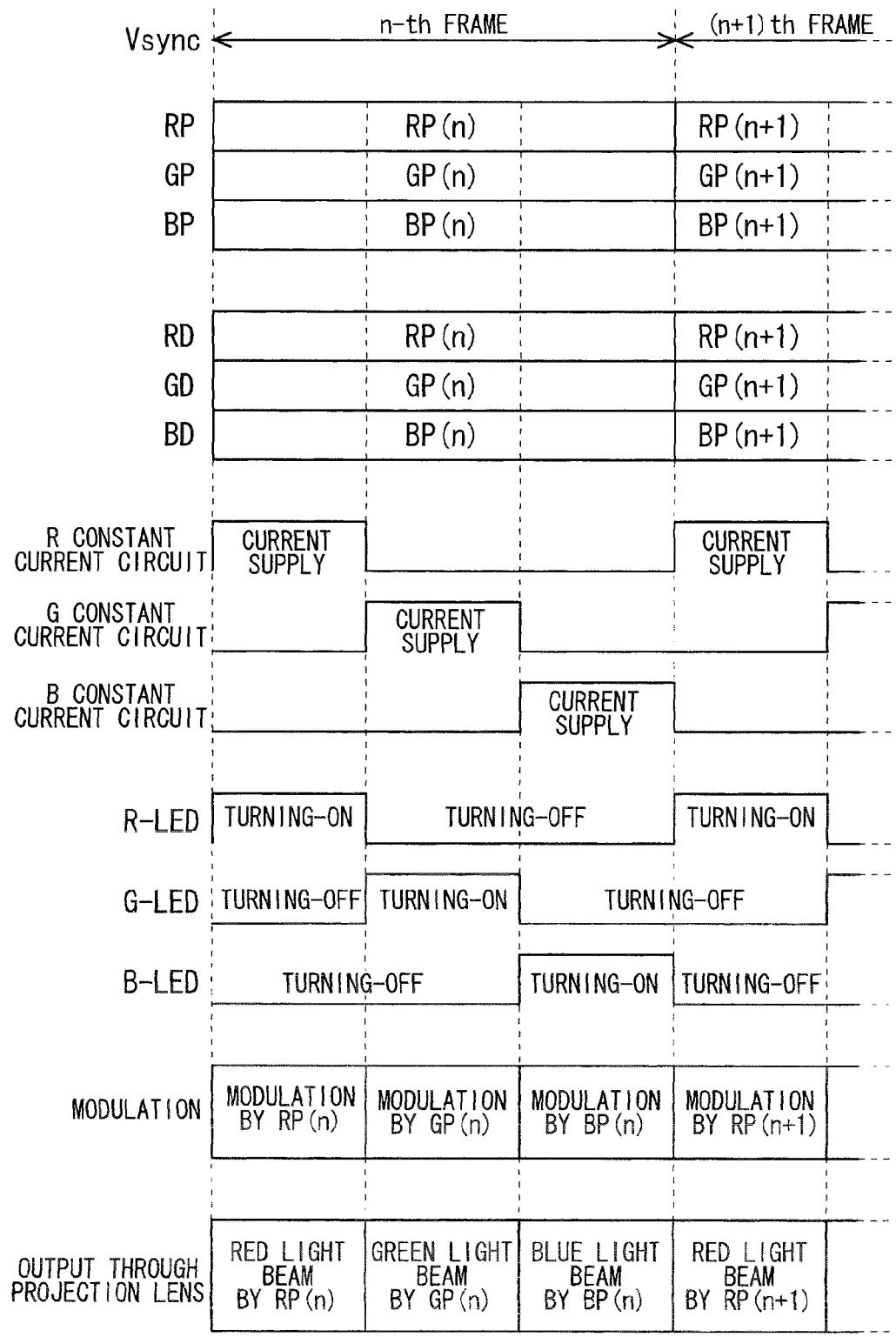
FIG. 5 is a diagram illustrating an operation of the display device according to the first embodiment (normal display; all light sources can be turned on).

Accordingly, based on the setting of drive timing by the control signals 61R, 61G, and 61B and the vertical synchronizing signal Vsync, the constant current circuits 71R, 71G, and 71B turn on the LEDs 10R, 10G, and 10B by sequentially switching those at timings obtained by dividing one frame period into three (see FIG. 5). That is, the LEDs 10R, 10G, and 10B are driven in a time division manner.

Based on the setting of drive timing by the control signal 62 and the vertical synchronizing signal Vsync, the modulation driving means 80 sequentially switches the provided pieces of video data RP, GP, and BP at timings obtained by dividing one frame period into three, and uses those for driving the modulation element 30 (see FIG. 5). That is, the modulation element 30 is driven in a time division manner.

Here, the sequence of turning on the LEDs 10R, 10G, and 10B and the sequence of using the pieces of video data RP, GP, and BP are not limited to those of the example of FIG. 5. Note that control is made such that modulation driving is performed by the pieces of video data corresponding to the emission colors of the LEDs to be turned on. That is, modulation driving is performed by the video data RD regarding red during the period in which the R-LED 10R turns on, modulation driving is performed by the video data GD regarding green during the period in which the G-LED 10G turns on, and modulation driving is performed by the video data BD regarding blue during the period in which the B-LED 10B turns on.

As a result, the red modulated light beam 31R (see FIG. 1) modulated by the video data RP, the green modulated light beam 31G (see FIG. 1) modulated by the video data GP, and the blue modulated light beam 31B (see FIG. 1) modulated by the video data BP are output through the projection lens 40 in a time division manner. Those video images of respective colors are projected onto the same area of the screen 50 in a time division manner. Note that those images are composed and appear to a user as a color video image.

Figure 6:
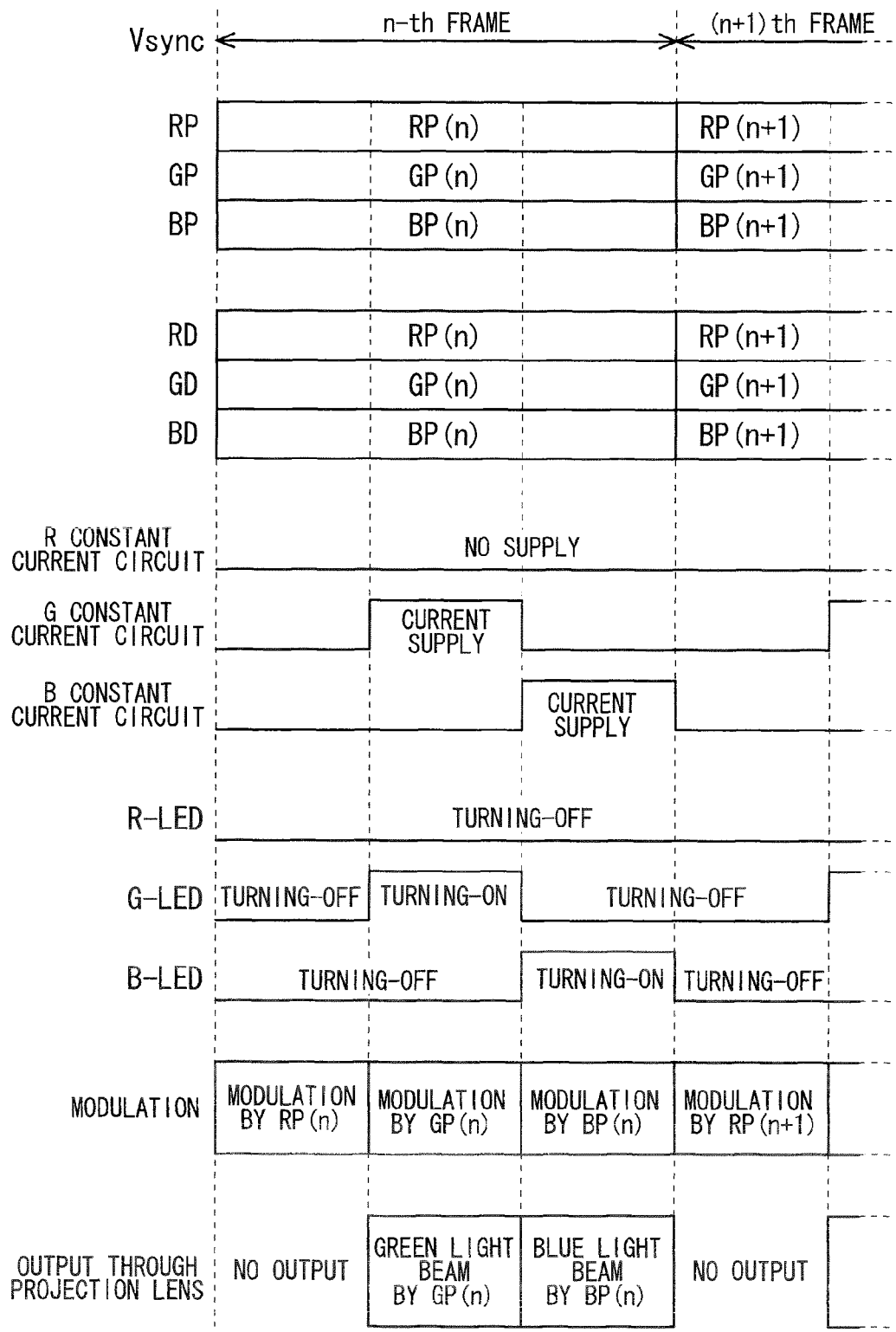
FIG. 6 is a diagram illustrating an operation of the display device according to the first embodiment (normal display; the red light source cannot be turned on).

Assumed here is a situation in which the R-LED 10R does not operate normally due to, for example, a failure of the R constant current circuit 71R. In a case in which a normal display operation is performed in such a situation, as shown in FIG. 6, a video image by the R-LED 10R is not projected. The same also holds true for the case in which, for example, the R-LED 10R per se is out of order.

Therefore, the gradation video image in a single red color shown in, for example, FIG. 7 is displayed as an entirely black video image as shown in FIG. 8. That is, the information (here, information of a red gradation video image) provided by the normal video data D1 is lost completely. The values shown in FIGS. 7 and 8 indicate the example of the pieces of video data RD, GD, and BD, that is, the example of gradation levels of red, green, and blue in a displayed video image.

Note that auxiliary display may be used in such a case. The auxiliary display is executed when a user requests auxiliary display via the operation means 100. The above-mentioned user instruction is input to the control means 60, and the control means 60 performs the next control process.

The control means 60 receives the instruction for auxiliary display, and then transmits the instruction signal 63 for causing the selection means 160 of the data providing means 90 to select the auxiliary video data D2 (illustrated here is luminance data Y) thereto (see FIG. 3). Accordingly, the auxiliary video data Y is provided to the modulation driving means 80 as the pieces of video data RD, GD, and BD. The auxiliary video data D2 is provided in synchronization with the vertical synchronizing signal Vsync on a frame-by-frame basis (see FIG. 9).

In the case of differentiating frames, the video data Y of the n-th frame is represented as Y(n), where n is a natural number.

The control means 60 sets the drive timings of the constant current circuits 71R, 71G, and 71B and the modulation driving means 80 similarly to those in normal display.

The setting contents of drive timing according to the first embodiment are the same between normal display and auxiliary display, whereby it is also possible to, for example, perform the setting when the power of the display device 1 is turned on and omit the setting operation in switching between normal display and auxiliary display.

Here, the operation itself of the modulation driving means 80 is the same between normal display and auxiliary display. However, the types of the pieces of video data RD, GD, and BD provided to the modulation driving means 80 differ therebetween as described above. That is, the pieces of data RD, GD, and BD provided in normal display correspond to the pieces of data RP, GP, and DP regarding a display color, respectively (see FIG. 5). On the other hand, the pieces of data RD, GD, and BD provided in auxiliary display are the data Y regarding the display luminance, and the pieces of data RD, GD, and BD are the data containing the same contents as well (see FIG. 9).

Figure 9:
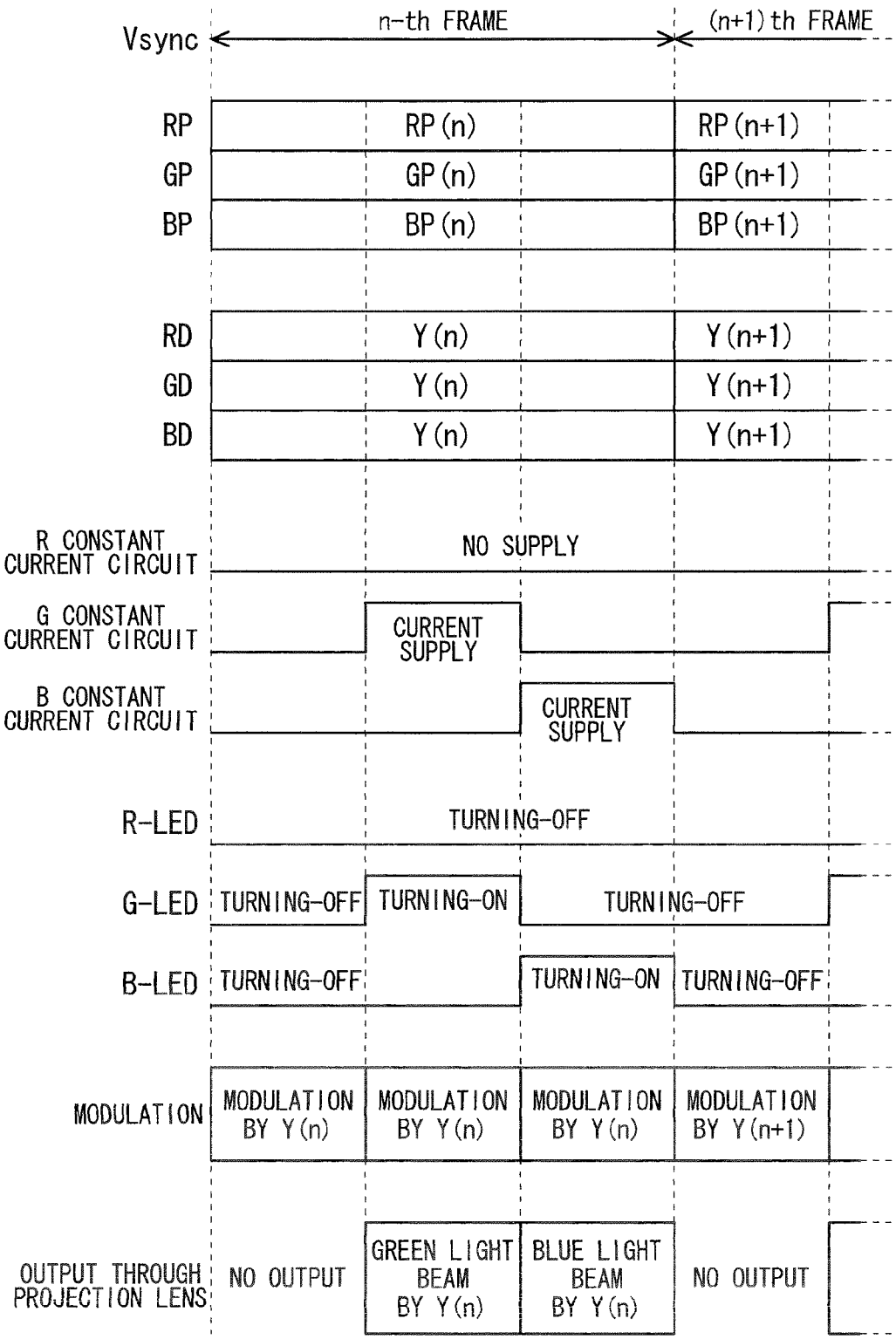
FIG. 9 is a diagram illustrating an operation of the display device according to the first embodiment (auxiliary display, the red light source cannot be turned on).

Therefore, in auxiliary display, the modulation driving means 80 drives, during one frame period, the modulation element 30 by the auxiliary video data Y containing the same contents at the timings obtained by dividing this period into three (see FIG. 9). That is, the modulation element 30 is driven in a time division manner but performs the same modulation operation in all of the three divided periods of one frame period.

However, the R-LED 10R cannot be turned on, and thus a video image is not projected even if the modulation element 30 performs a modulation operation during the projection period of the R-LED 10R.

As a result, the green modulated light beam 31G (see FIG. 1) modulated by the video data Y and the blue modulated light beam 31B (see FIG. 1) modulated by the video data Y are output through the projection lens 40 in a time division manner. Accordingly, a green video image and a blue video image are projected onto the screen 50 in a time division manner.

In this case, the gradation video image in a single red color shown in, for example, FIG. 7 is displayed as a gradation video image in a light blue color as shown in FIG. 10. The values shown in FIG. 10 indicate the example of the pieces of video data RD, GD, and BD, that is, the example of gradation levels of red, green, and blue in a displayed video image.

That is, according to auxiliary display, the information of a red color is lost but the information of gradation can be displayed. Therefore, it is possible to avoid a complete loss of the information (in this case, information of a red gradation video image) provided by the normal video data D1. It is considered that, in the red gradation video image illustrated here, the importance of gradation is greater than that of the information of red, and thus auxiliary display is effective in avoiding a loss of important information.

Figure 11:
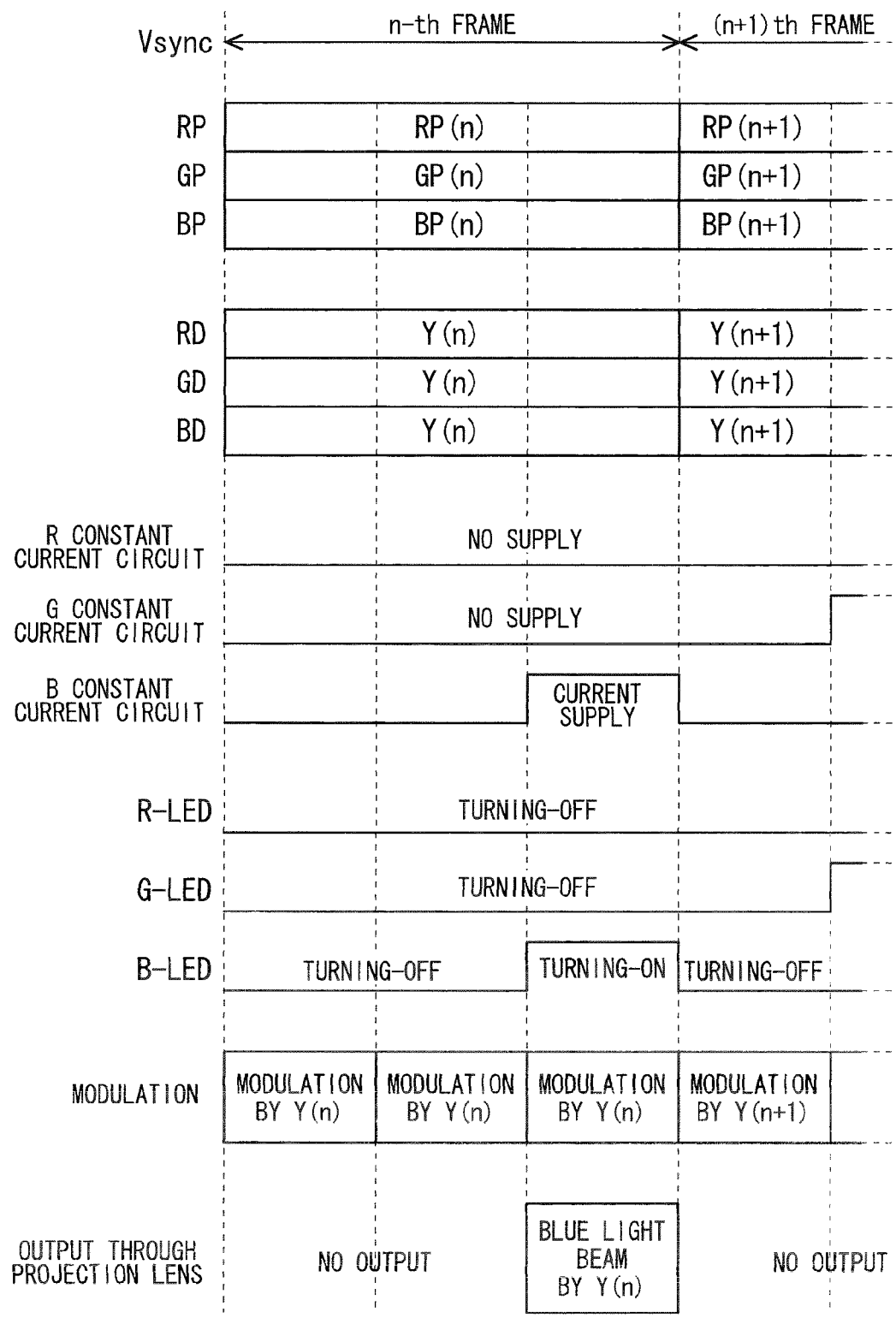
FIG. 11 is a diagram illustrating an operation of the display device according to the first embodiment (auxiliary display; the red and green light sources cannot be turned on).

Also in the case where the G-LED 10G or B-LED 10B cannot be turned on, it is possible to avoid a complete loss of the information provided by the normal video data D1. Further, similar effects can be achieved also in a case where two colors among three colors cannot be used. FIG. 11 illustrates a case in which the R-LED 10R and G-LED 10G cannot be turned on.

<Effects>

As described above, according to the display device 1, it is possible to switch between the normal video data D1 and the auxiliary video data D2. Therefore, in a case in which, for example, a part of the light sources cannot be turned on, it is possible to avoid, with the use of the auxiliary video data D2, the situation in which the information assigned to the light source that cannot be turned on in the normal video data D1 cannot be displayed at all.

The above-mentioned effect can be achieved owing to a fact that the auxiliary video data D2 is different from the normal video data D1.

However, it is more preferable to generate the auxiliary video data D2 by subjecting the pieces of video data RP, GP, and BP included in the normal video data D1 to linear combination (where a coefficient is not a zero). The reason for this is as follows. According to the linear combination, the pieces of video data RP, GP, and BP assigned to the LEDs 10R, 10G, and 10B in normal display, respectively, are all incorporated into the auxiliary video data D2. Therefore, also in a case in which a part of the LEDs cannot be turned on, the above-mentioned effect can be achieved by the remaining LEDs more reliably. The RGB→Y conversion has been taken as an example of the linear combination operation, which is not limited thereto.

In relation to the linear combination operation, the case in which the auxiliary video data D2 contains the same data contents regarding the pieces of video data RD, GD, and BD has been illustrated. However, it is also possible to set the linear combination operation such that the pieces of video data RD, GD, and BD in auxiliary display contain different data contents.

Note that it is more preferable that the auxiliary video data D2 be the single data assigned to the LEDs 10R, 10G, and 10B in common as described above. According to this, the pieces of data assigned to the LEDs 10R, 10G, and 10B contain the same contents, and thus, means of generating the auxiliary video data D2, that is, the computing means 150 can be made to have a simple configuration. Also, it suffices to use the auxiliary video data in place of the normal video data by assigning the same auxiliary video data D2 to the all LEDs 10R, 10G, and 10B including the LED that cannot be turned on. That is, it is not required to change modulation control and the like between normal display and auxiliary display. Accordingly, the device configuration can be simplified. The simplified configuration as described above leads to a cost reduction.

It is also possible to employ the data other than the luminance component data Y as the auxiliary video data D2. However, according to the luminance component of a video image provided by the input video signal, the input video image is displayed in monochrome, whereby it is possible to more reliably avoid the situation in which the information assigned to the light source that cannot be turned on in the normal video data D1 cannot be displayed at all.

Incidentally, the computing means 150 performs the conversion from the normal video data 124 to the auxiliary video data D2 in accordance with a predetermined computation. Therefore, it is possible to, for example, make a conversion control flow simpler, reduce a size of a device configuration, and change the computation contents more easily compared with the conversion using a so-called look-up table (LUT).

For example, in the configuration of Patent Document 2, an image frame used in a failure of a light source is generated using the LUT. In particular, FIG. 5 of Patent Document 2 shows a flowchart when the LUT is used, and it is revealed from the flowchart that there are many case analyses. Therefore, it is assumed that a complicated conversion control flow is required. Contrary to this, with the configuration according to this first embodiment, the auxiliary video data D2 is generated by the computation process according to the predetermined computing equation, and thus the conversion control flow is simple (see FIG. 4).

Also, the conversion control flow is simple, which merely requires a simple configuration for executing the flow. Therefore, the size of the device configuration can be reduced.

Also, according to the computing means 150, it is easy to change multiplication coefficients in the multipliers 151R, 151G, and 151B. That is, the computation contents are changed easily. Contrast to this, according to the LUT mode, the all contents of the LUT need to be changed, leading to a large-scale change of the computation contents.

<Second Embodiment>

A second embodiment describes a variation of the data providing means 90 (see FIG. 1).

First, the auxiliary video data D2 is given by Equation (1) described above in the first embodiment. Also, the auxiliary video data D2 is set for all of the pieces of video data RD, GD, and BD output from the data providing means 90 in auxiliary display. Accordingly, Equation (4) below is derived.

[Math 4]

$$\begin{pmatrix} RD \\ GD \\ BD \end{pmatrix} = \begin{pmatrix} \alpha r \times RP + \alpha g \times GP + \alpha b \times BP \\ \alpha r \times RP + \alpha g \times GP + \alpha b \times BP \\ \alpha r \times RP + \alpha g \times GP + \alpha b \times BP \end{pmatrix} \quad (4)$$

$$= \begin{pmatrix} \alpha r & \alpha g & \alpha b \\ \alpha r & \alpha g & \alpha b \\ \alpha r & \alpha g & \alpha b \end{pmatrix} \begin{pmatrix} RP \\ GP \\ BP \end{pmatrix}$$

Contrary to this, the pieces of video data RD, GD, and BD in normal display can be represented by Equation (5) below.

[Math 5]

$$\begin{pmatrix} RD \\ GD \\ BD \end{pmatrix} = \begin{pmatrix} RP \\ GP \\ BP \end{pmatrix} \quad (5)$$

$$= \begin{pmatrix} 1 \times RP + 0 \times GP + 0 \times BP \\ 0 \times RP + 1 \times GP + 0 \times BP \\ 0 \times RP + 0 \times GP + 1 \times BP \end{pmatrix}$$

$$= \begin{pmatrix} 1 & 0 & 0 \\ 0 & 1 & 0 \\ 0 & 0 & 1 \end{pmatrix} \begin{pmatrix} RP \\ GP \\ BP \end{pmatrix}$$

Here, Equations (4) and (5) are generalized by Equation (6) below.

[Math 6]

$$\begin{pmatrix} RD \\ GD \\ BD \end{pmatrix} = \begin{pmatrix} \alpha 11 & \alpha 12 & \alpha 13 \\ \alpha 21 & \alpha 22 & \alpha 23 \\ \alpha 31 & \alpha 32 & \alpha 33 \end{pmatrix} \begin{pmatrix} RP \\ GP \\ BP \end{pmatrix} \quad (6)$$

That is, by switching the values of the coefficients α11 to α13, α21 to α23, and α31 to α33 between normal display and auxiliary display in Equation (6), any one of Equations (4) and (5) can be appropriately selected. More specifically, Equation (5) is obtained by setting the coefficients α11, α22, and α33 to one and setting the other coefficients to zero. Also, Equation (4) is obtained by setting the coefficients α11, α21, and α31 to αr, setting the coefficients α12, α22, and α32 to αg, and setting the coefficients α13, α23, and α33 to αb.

From the viewpoint above, the data computing means of the data providing means 90 can be configured as shown in FIG. 12. Data computing means 141 illustrated in FIG. 12 includes computing means 170 and selection means 180.

The computing means 170 includes a multiplier 171R that multiplies the video data RP by the coefficient α11, a multiplier 171G that multiplies the video data GP by the coefficient α12, a multiplier 171B that multiplies the video data BP by the coefficient α13, and an adder 172 that adds the multiplication results by the multipliers 171R, 171G, and 171B together. The addition result by the adder 172 is the video data RD.

Similarly, the computing means 170 includes multipliers 173R, 173G, and 173B that multiply the pieces of video data RP, GP, and BP by the coefficients α21, α22, and α23, respectively, and an adder 174 that adds multiplication results by the multipliers 173R, 173G, and 173B together. The addition result by the adder 174 is the video data GD.

Similarly, the computing means 170 includes multipliers 175R, 175G, and 175B that multiply the pieces of video data RP, GP, and BP by the coefficients α31, α32, and α33, respectively, and an adder 176 that adds the multiplication results by the multipliers 175R, 175G, and 175B together. The addition result by the adder 176 is the video data BD.

The selection means 180 sets values of the coefficients α11 to α13, α21 to α23, and α31 to α33 in accordance with the selection instructing signal 63 from the control means 60 (see FIG. 1).

That is, the computing means 170 is configured so as to change the computation contents.

Figure 13:
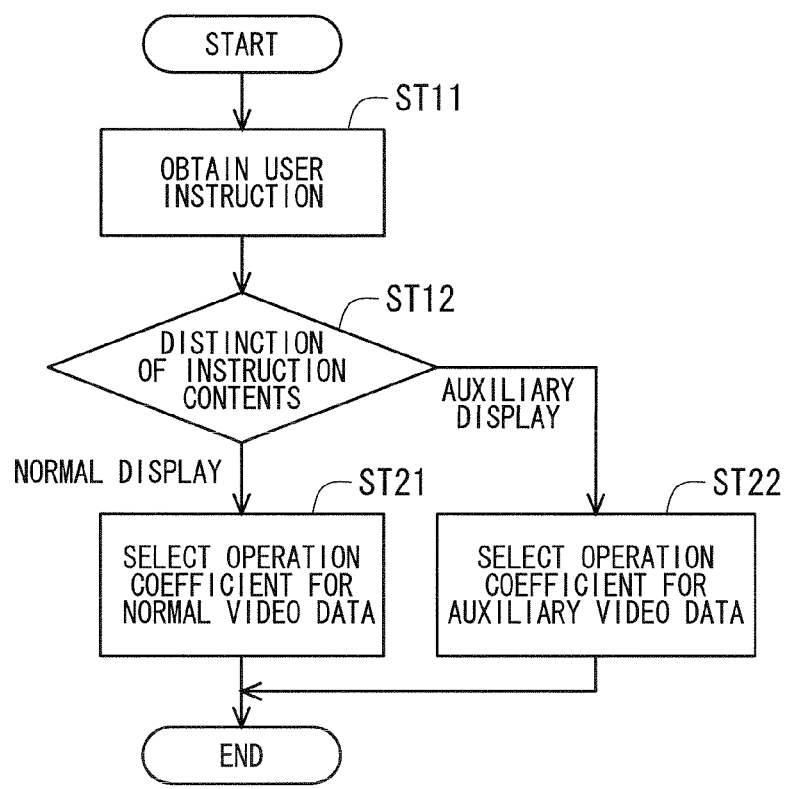
FIG. 13 is a flowchart illustrating video data selection according to the second embodiment.

According to the above-mentioned configuration, as illustrated in the flowchart of FIG. 13, the control means 60 obtains an instruction from a user (Step ST11), and outputs the selection instructing signal 63 containing the contents according to the distinction result of the user instruction (Step ST12). Then, the selection means 180 selects an operation coefficient for the normal video data D1 or an operation coefficient for the auxiliary video data D2 in accordance with the contents of the selection instructing signal 63, and sets the selected operation coefficient to the multipliers 171R, 171G, 171B, 173R, 173G, 173B, 175R, 175G, and 175B (Steps ST21 and ST22). Accordingly, Computing Equation (5) for the normal video data D1 or Computing Equation (4) for the auxiliary video data D2 can be selectively employed.

The various effects described in the first embodiment can be achieved also by the display device 1 employing the data computing means 141. According to the data computing means 140 (see FIG. 3) illustrated in the first embodiment, the configuration size can be reduced compared with the data computing means 141 (see FIG. 12), leading to reductions in device size, cost, and the like.

<Third Embodiment>

A third embodiment describes a variation of the LEDs 10R, 10G, and 10B and the operation of the modulation element 30 in auxiliary display. Although illustrated here is a case in which the display device 1 has the configuration according to the first embodiment, it is also possible to employ the configuration of the second embodiment.

Figure 14:
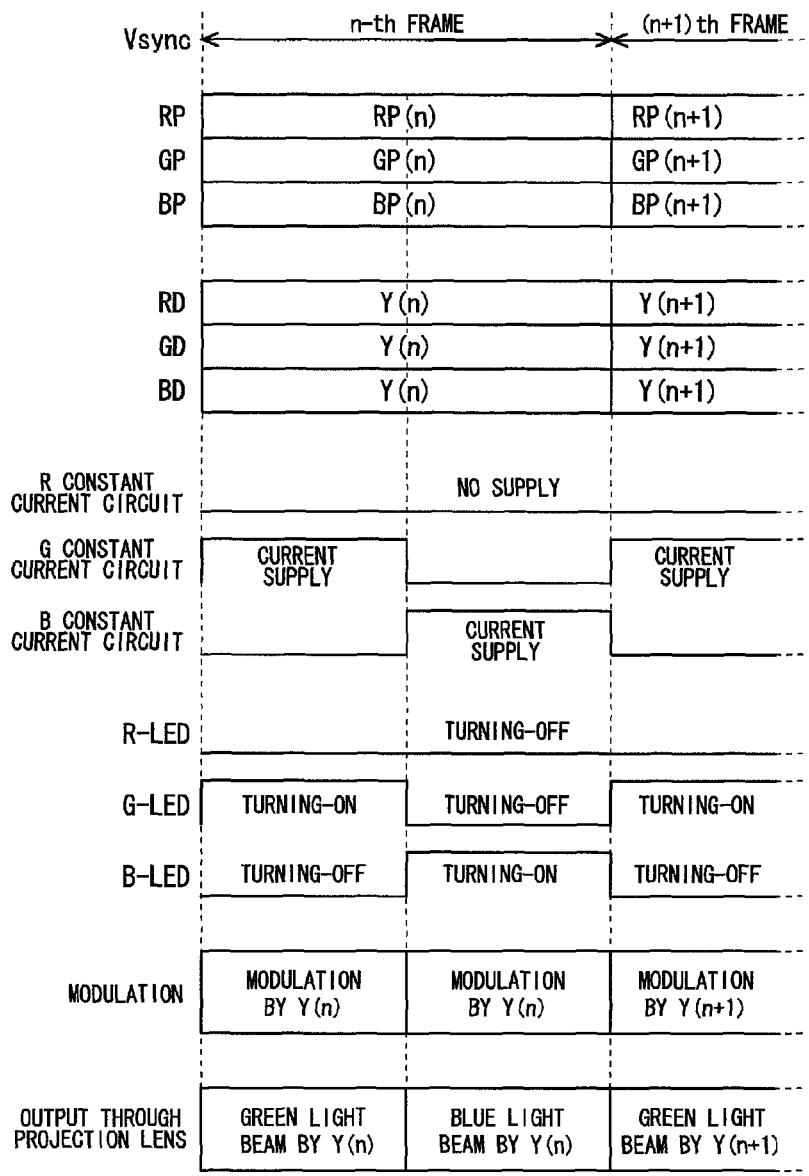
FIG. 14 is a diagram illustrating an operation of a display device according to a third embodiment (auxiliary display; the red light source cannot be turned on).

FIG. 14 diagrammatically illustrates the operation in auxiliary display according to the third embodiment. FIG. 14 illustrates a case in which the R-LED 10R cannot be turned on, similarly to FIG. 9 above. The comparison between FIGS. 14 and 9 makes it easy to understand the auxiliary display operation according to the third embodiment. That is, in the auxiliary display operation according to the third embodiment, the control means 60 (see FIG. 1) performs control for assigning a projection period (see FIG. 9) assigned to the R-LED 10R that is a part of the light sources among the three LEDs 10R, 10G, and 10B to video projection by the G-LED 10G and the B-LED 10B that are the remaining light sources among the three LEDs 10R, 10G, and 10B. The control process for causing the selection means 160 to select the auxiliary video data D2 by the control means 60 in the auxiliary display operation is similar to that of the first embodiment, which is not described here again.

Upon reception of the instruction for auxiliary display, the control means 60 transmits the control signals 61R, 61G, 61B, and 62 regarding the setting of drive timings to the constant current circuits 71R, 71G, and 71B and the modulation driving means 80. More specifically, the control signals 61R, 61G, 61B, and 62 in auxiliary display contain the contents that one frame period is assigned only to the LEDs 10G and 10B that can be turned on, that is, that operation is made at a timing at which one frame period is divided into two.

Accordingly, the constant current circuits 71R, 71G, and 71B turn on the LEDs 10G and 10B that can be turned on by sequentially switching therebetween at a timing at which one frame period is divided into two, based on the setting of drive timings by the control signals 61R, 61G, and 61B and the vertical synchronizing signal Vsync (see FIG. 14). That is, only the LEDs 10G and 10B that can be turned on are driven in a time division manner.

The modulation driving means 80 repeatedly uses the provided auxiliary video data Y at a timing at which one frame period is divided into two, based on the setting of drive timing by the control signal 62 and the vertical synchronizing signal Vsync (see FIG. 14).

As a result, the green modulated light beam 31G (see FIG. 1) modulated by the auxiliary video data Y and the blue modulated light beam 31B (see FIG. 1) modulated by the auxiliary video data Y are output through the projection lens 40 in a time division manner. Accordingly, a green video image and a blue video image are projected onto the screen 50 in a time division manner.

According to the above-mentioned configuration, effects below can be achieved in addition to the various effects described in the first embodiment, etc.

That is, the projection period (see FIG. 9) assigned to the R-LED 10R that cannot be turned on is assigned to the video projection by the LEDs 10G and 10B that can be turned on, which enables to eliminate the period in which the LEDs are turned off continuously. Therefore, more bright display can be achieved as a whole compared with the first embodiment, etc.

While the case in which the R-LED 10R cannot be turned on has been illustrated, the auxiliary display operation is applicable also to the case in which the G-LED 10G or the B-LED 10B cannot be turned on, and similar effects can be achieved.

While the case in which one frame period is divided equally by the number of LEDs that can be turned on has been illustrated, the division may be performed at an unequal ratio. In this case, the ratio of unequal division may be set in a fixed manner in advance or may be made adjustable via the operation means 100.

Figure 15:
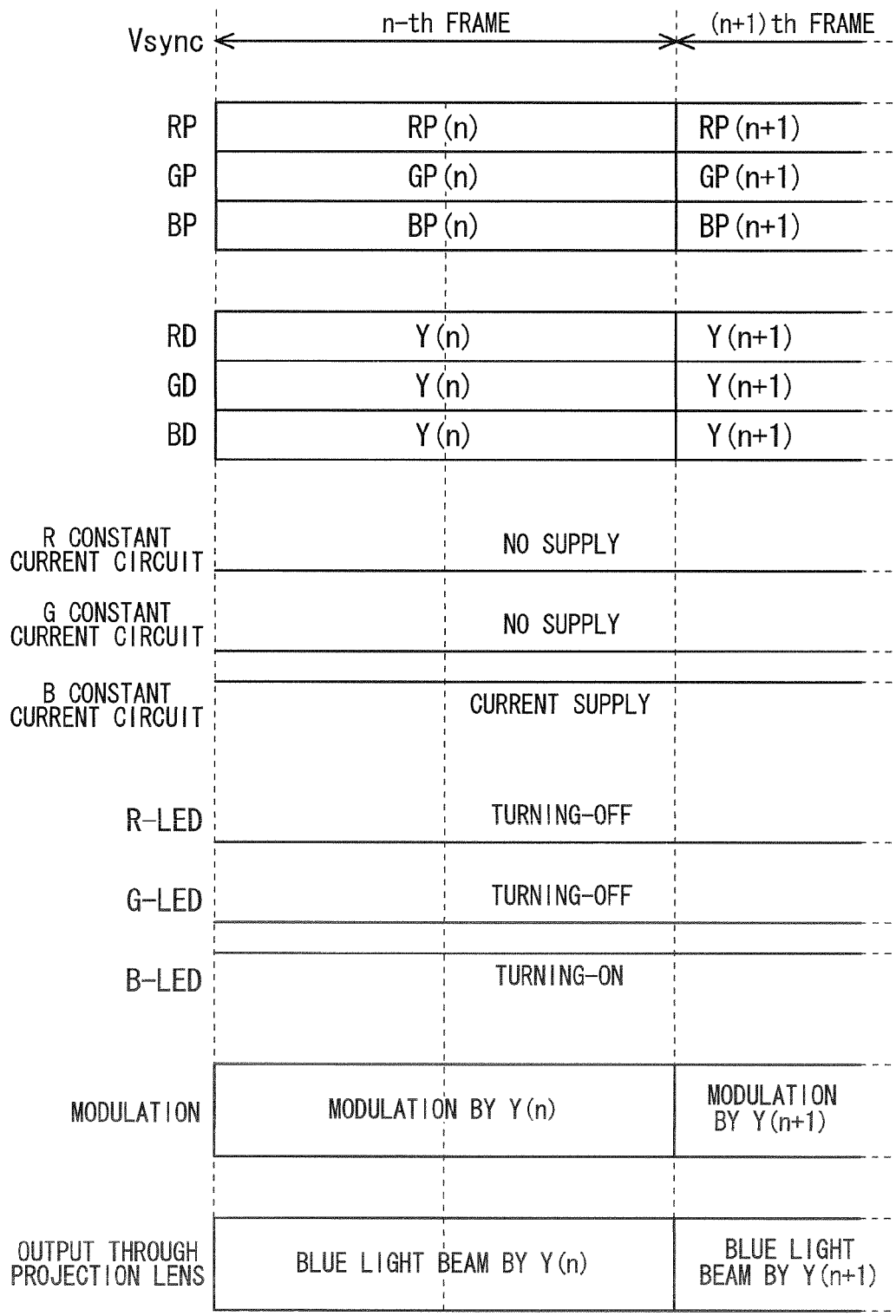
FIG. 15 is a diagram illustrating an operation of the display device according to the third embodiment (auxiliary display; the red and green light sources cannot be turned on).

The auxiliary display operation is also applicable to a case in which arbitrary two colors among three colors cannot be used. FIG. 15 illustrates a case in which two light sources, the R-LED 10R and G-LED 10G, cannot be turned on. In this case, one frame period is divided into one for the B-LED 10B that can be turned on. That is, the whole of one frame period is assigned to the turning-on period of time of the B-LED 10B. Accordingly, the above-mentioned effects can be achieved.

A mode in which the LEDs other than the R-LED 10R are used (referred to as GB mode), a mode in which the LEDs other than the G-LED 10G are used (referred to as RB mode), and a mode in which the LEDs other than the B-LED 10B are used (referred to as RG mode) may be prepared assuming the case where only one color among three colors cannot be turned on, so that a user selects any one of the modes via the operation means 100 (see FIG. 1).

For example, the GB mode should be selected in a case where the R-LED 10R cannot be turned on, but a single blue color is displayed when the RB mode is selected and a single green color is displayed when the RG mode is selected, which makes the mode selection easy for a user. That is, it is possible to judge that the mode selection is inappropriate in a case where a single-color video image in any of red (R), green (G), and blue (B) is displayed.

Similarly, a mode in which the LEDs other than the LEDs 10R and 10G are used (referred to as B mode), a mode in which the LEDs other than the LEDs 10G and 10B are used (referred to as R mode), and a mode in which the LEDs other than the LEDs 10B and 10R are used (referred to as G mode) may be prepared assuming the case where two colors among three colors cannot be turned on, so that a user selects any one of the modes via the operation means 100 (see FIG. 1).

For example, the B mode should be selected in a case where the LEDs 10R and 10G cannot be turned on, but a video image is not displayed even when the R mode and the G mode are selected, which makes the mode selection easy for a user. That is, it is possible to judge that the mode selection is inappropriate in a case where a video image is not displayed.

<Fourth Embodiment>

The first to third embodiments have illustrated the cases in which a user performs switching between normal display and auxiliary display. Meanwhile, a fourth embodiment illustrates the configuration for automating the switching FIG. 16 illustrates a block diagram of a display device 2 according to the fourth embodiment. The display device 2 illustrated in FIG. 16 has a configuration in which detection means 190 that detects turning-on states of the LEDs 10R, 10G, and 10B is added to the display device 1 (see FIG. 1) according to the first embodiment. It is also possible to add the detection means 190 to the display device 1 according to the second or third embodiment.

The detection means 190 can be implemented as, for example, a plurality of optical sensors respectively provided for the LEDs 10R, 10G, and 10B. More specifically, the optical sensor for the R-LED 10R is provided so as to detect the emitted light beam 11R from the R-LED 10R, and similarly, the optical sensors for the LEDs 10G and 10B are respectively provided. According to this example, it is possible to detect the turning-on states of the LEDs 10R, 10G, and 10B through the detection of the presence/absence of the emitted light beams 11R, 11G, and 11B or an amount of light.

Alternatively, the detection means 190 can be implemented as, for example, a plurality of current sensors respectively provided for the LEDs 10R, 10G, and 10B. More specifically, the current sensor for the R-LED 10R is provided so as to detect a current supplied to the R-LED 10R, and similarly, the current sensors for the LEDs 10G and 10B are respectively provided. According to this example, it is possible to detect the turning-on states of the LEDs 10R, 10G, and 10B through the detection of the presence/absence of the currents supplied to the LEDs 10R, 10G, and 10B or an amount of current.

It is also possible to employ, for example, voltage sensors that detect the voltages applied to the LEDs 10R, 10G, and 10B, or power sensors that detect the power supplied to the LEDs 10R, 10G, and 10B.

Figure 17:
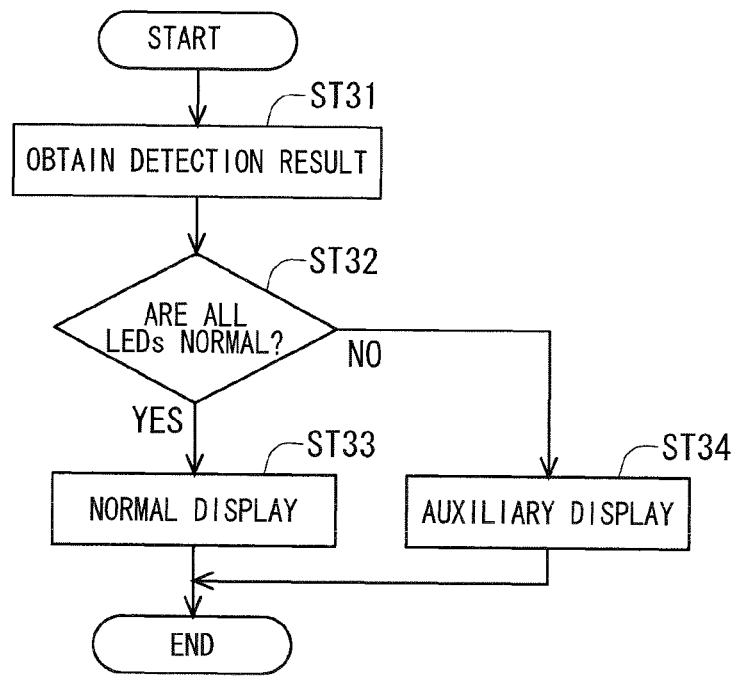
FIG. 17 is a flowchart illustrating display type selection according to the fourth embodiment.

The detection results by the detection means 190 are transferred to the control means 60, and the control means 60 controls the selection means 160 (see FIG. 3) and the like based on the detection results. Here, FIG. 17 illustrates a flowchart of this control. According to the example of FIG. 17, the control means 60 obtains the detection results by the detection means 190 (Step ST31), and judges whether or not the LEDs 10R, 10G, and 10B are respectively turned on at predetermined timings and for periods from the detection results, to thereby judge whether or not the LEDs 10R, 10G, and 10B all operate normally (Step ST32). In a case of judging that not all of the LEDs 10R, 10G, 10B operate normally, the control means 60 performs control for normal display (Step ST33). On the other hand, in a case of judging that the LEDs 10R, 10G, 10B do not all operate normally, the control means 60 performs control for auxiliary display (Step ST34).

The LED that can be turned on can be specified based on the detection results by the detection means 190, and thus, the control means 60 can select a mode such as the GB mode described in the third embodiment.

According to the display device 2, the following effect can be achieved in addition to the various effects described in the first embodiment, etc. That is, switching between normal display and auxiliary display can be performed automatically, leading to high degree of convenience.

<Fifth Embodiment>

FIG. 18 illustrates a block diagram of a display device 3 according to a fifth embodiment. The display device 3 illustrated in FIG. 18 basically has a similar configuration to that of the display device 1 (see FIG. 1) according to the first embodiment except for that modulation means 32 is included in place of the modulation means 30 (see FIG. 1). The modulation means 32 is composed of three modulation elements 33R, 33G, and 33B. It is also possible to employ the modulation means 32 in the display devices 1 and 2 according to the second to fourth embodiments.

The modulation element 33R for the R-LED 10R is provided at some midpoint in an optical path through which the emitted light beam from the R-LED 10R enters the dichroic mirror 20, and performs optical intensity modulation on the emitted light beam from the R-LED 10R. The modulation elements 33G and 33B for the LEDs 10G and 10B are also provided in a similar manner. The modulated light beams respectively output from the modulation elements 33R, 33G, and 33B are guided in the same direction by the dichroic mirror 20, and then, are output through the projection lens 40.

Correspondingly to the above-mentioned configuration of the modulation means 32, the modulation driving means 80 drives the modulation element 33 based on the video data RD, drives the modulation element 33G based on the video data GD, and drives the modulation element 33B based on the video data BD. According to the display device 3, in particular, it is also possible to drive the three modulation elements 33R, 33G, and 33B in a time division manner or drive those in a mode of driving those simultaneously in parallel (so-called parallel driving mode).

Also according to the display device 3, the various effects described in the first embodiment, etc. can be achieved. The configuration size of the modulation means can be made smaller in the first embodiment than that the fifth embodiment, leading to reductions in size, cost, and the like of the device.

Projection means may be configured by providing a projection leans for each of the LEDs 10R, 10G, and 10B. In this case, video images by the LEDs 10R, 10G, and 10B may be guided onto the same area of the screen 50 by adjusting an output optical path from each projection lens without using the dichroic mirror 20. The various effects described above can be achieved also with the above-mentioned projection means. Note that this projection means can also be employed in the first to fourth embodiments.

<Sixth Embodiment>

Figure 19:
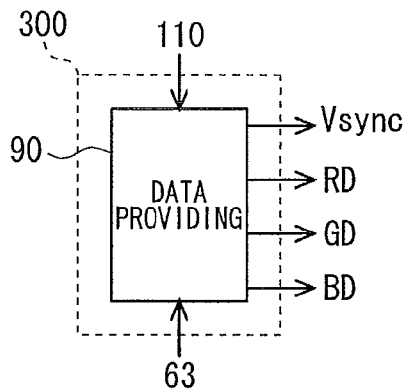
FIG. 19 is a block diagram illustrating a video processing device according to a sixth embodiment.
Figure 20:
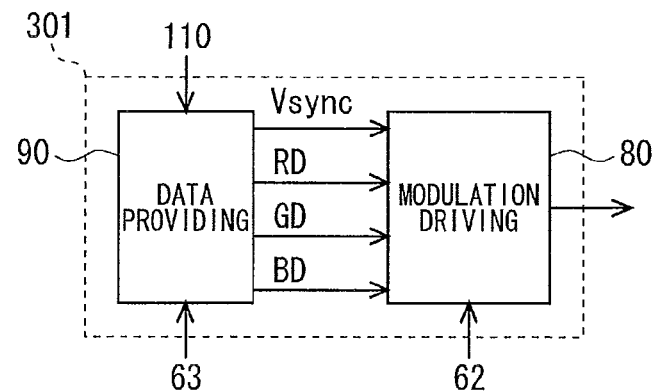
FIG. 20 is a block diagram illustrating another video processing device according to the sixth embodiment.
Figure 21:
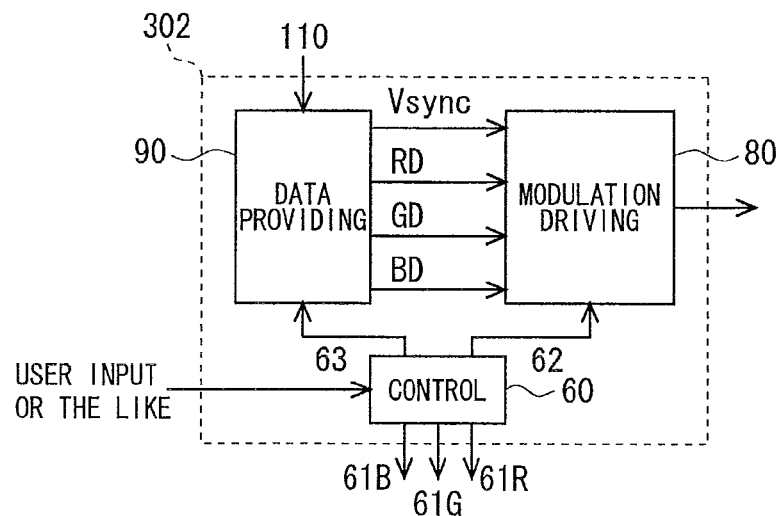
FIG. 21 is a block diagram illustrating still another video processing device according to the sixth embodiment.

FIGS. 19 to 21 illustrate block diagrams of video processing devices 300 to 302 according to a sixth embodiment. The video processing device 300 illustrated in FIG. 19 includes the data providing means 90 described above. The video processing device 301 illustrated in FIG. 20 has a configuration in which the modulation driving means 80 described above is added to the video processing device 300, and the video processing device 302 illustrated in FIG. 21 has a configuration in which the control means 60 described above is added to the video processing device 301. According to the video processing devices 300 to 302, for example, the display device 1 exhibiting the above-mentioned various effects can be provided easily.

While the invention has been shown and described in detail, the foregoing description is in all aspects illustrative and not restrictive. It is therefore understood that numerous modifications and variations can be devised without departing from the scope of the invention.

Description of Reference Symbols 1 to 3: display device, 10R, 10G, 10B: light source, 11R, 11G, 11B: emitted light beam, 30, 32: modulation means, 60: control means, 80: modulation driving means, 90: data providing means, 110: input video signal, 120: normal video data acquisition means, 150, 170: computing means, 160, 180: selection means, D1, RP, GP, BP: normal video data, D2, Y: auxiliary video data, 300 to 302: video processing device.

The invention claimed is:

1. A display device, comprising:
   a plurality of light sources;
   a modulation section performing optical intensity modulation on emitted light beams from said plurality of light sources;
   a modulation driving section driving said modulation section based on pieces of video data;
   a data providing section connected to said modulation driving section, said data providing section and providing said pieces of video data to said modulation driving section; and
   a control section controlling said data providing section, wherein said data providing section includes:
      a normal video data acquisition section acquiring from an input video signal, as normal video data, a plurality of pieces of video data in a form of RGB signals respectively assigned to said plurality of light sources for use in a normal display operation;
      a computing section performing a predetermined computation on said plurality of pieces of video data included in said normal video data to generate auxiliary video data in a form of Y luminance signals for use in place of said RGB signals during an auxiliary display operation which is performed without use of part of said plurality of light sources; and
      a selection section performing, in accordance with an instruction from said control section selecting between said normal display operation or said auxiliary display operation, a selection process for selecting between said normal video data in the form of said RGB signals and said auxiliary video data in the form of said Y luminance signals, said selection section providing said selected video data to said modulation driving section, said modulation driving section using said selected video data to drive said modulation section,
   wherein, upon performing video projection by said plurality of light sources in a time division manner, said control section performs control for reassigning a projection period, which during said normal display operation is assigned for video projection by said part of said plurality of light sources, for video projection by a remainder of said plurality of light sources when said auxiliary display operation is performed,
   wherein said control section issues an instruction selecting said normal display operation thereby causing said selection section to select said normal video data in the form of said RGB signals when use of said part of said plurality of light sources is available, and issues an instruction selecting said auxiliary display operation thereby causing said selection section to select said auxiliary video data in the form of said Y luminance signals when use of said part of said plurality of light sources is unavailable.

2. The display device according to claim 1, wherein said predetermined computation includes linear combination with a non-zero coefficient for said plurality of pieces of video data included in said normal video data.

3. The display device according to claim 1, wherein said auxiliary video data is single data assigned to said plurality of light sources in common.

4. The display device according to claim 1, wherein
   said auxiliary video data is data of a luminance component of a video image provided by said input video signal, and
   said predetermined computation includes a computation of generating said data of the luminance component from said plurality of pieces of video data included in said normal video data.

5. The display device according to claim 1, further comprising detection section detecting turning-on states of said plurality of light sources,
   wherein said control section controls said selection section based on detection results by said detection section.

6. A video processing device applicable to a video display mode in which optical intensity modulation is performed on emitted light beams from a plurality of light sources, the video processing device comprising:
   a normal video data acquisition section acquiring from an input video signal, as normal video data, a plurality of pieces of video data in a form of RGB signals respectively assigned to said plurality of light sources for use in a normal display operation;
   a computing section performing a predetermined computation on said plurality of pieces of video data included in said normal video data to generate auxiliary video data in a form of Y luminance signals for use in place of said RGB signals during an auxiliary display operation which is performed without use of part of said plurality of light sources;
   a selection section performing, in accordance with an instruction selecting between said normal display operation and said auxiliary display operation, a selection process for selecting between said normal video data in the form of said RGB signals and said auxiliary video data in the form of said Y luminance signals, said selection section providing said selected video data to said modulation driving section; and
   a control section issuing said instruction to said selection section,
   wherein upon performing video projection by said plurality of light sources in a time division manner, said control section performs control for reassigning a projection period, which during said normal display operation is assigned for video projection by said part of said plurality of light sources, for video projection by a remainder of said plurality of light sources when said auxiliary display operation is performed, and
   wherein said control section issues an instruction selecting said normal display operation thereby causing said selection section to select said normal video data in the form of said RGB signals when use of said part of said plurality of light sources is available, and issues an instruction selecting said auxiliary display operation thereby causing said selection section to select said auxiliary video data in the form of said Y luminance signals when use of said part of said plurality of light sources is unavailable.

7. A video display method with a display device performing optical intensity modulation on emitted light beams from a plurality of light sources, comprising:
   acquiring by said display device from an input video signal, as normal video data, a plurality of pieces of video data in a form of RGB signals respectively assigned to said plurality of light sources for use in a normal display operation;

performing a predetermined computation by said display device, on said plurality of pieces of video data included in said normal video data to generate auxiliary video data in a form of Y luminance signals for use in place of said RGB signals during an auxiliary display operation which is performed without use of part of said plurality of light sources; and performing a selection process for selecting between said normal video data in the form of said RGB signals and said auxiliary video data in the form of said Y luminance signals to be used for optical intensity modulation;

performing optical intensity modulation by said display device based on the selected one of said normal video data in the form of said RGB signals and said auxiliary video data in the form of said Y luminance signals in such manner that:

said optical intensity modulation is performed based on said normal video data in the form of said RGB signals in a case where said normal display operation is being performed and each of said plurality of light sources are all allowed to turn on and, and said optical intensity modulation is performed based on said auxiliary video data in the form of Y luminance signals in a case where said auxiliary video operation is being performed and said part of said plurality of light sources is not allowed to turn on, wherein upon performing video projection by said plurality of light sources in a time division manner, control for reassigning a projection period, which during said normal display operation is assigned to said part of said plurality of light sources, for video projection by a remainder of said plurality of light sources when said auxiliary display operation is performed, and wherein the selection process selects said normal video data in the form of said RGB signals when use of said part of said plurality of light sources is available, and wherein the selection process selects said auxiliary video data in the form of said Y luminance signals when use of said part of said plurality of light sources is unavailable.

* * * * *